US011727423B2

(12) United States Patent
Splaine et al.

(10) Patent No.: US 11,727,423 B2
(45) Date of Patent: Aug. 15, 2023

(54) METHODS AND APPARATUS TO COLLECT IMPRESSIONS ASSOCIATED WITH OVER-THE-TOP MEDIA DEVICES

(71) Applicant: The Nielsen Company (US), LLC, New York, NY (US)

(72) Inventors: Steven J. Splaine, Tampa, FL (US); Robert F. Pierce, Oldsmar, FL (US); Adrian Swift, Brooklyn, NY (US); Ankur Tandon, Riverview, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/188,878

(22) Filed: Mar. 1, 2021

(65) Prior Publication Data
US 2021/0182888 A1 Jun. 17, 2021

Related U.S. Application Data

(63) Continuation of application No. 16/525,970, filed on Jul. 30, 2019, now Pat. No. 10,937,043, which is a (Continued)

(51) Int. Cl.
*H04L 67/50* (2022.01)
*H04L 67/02* (2022.01)
(Continued)

(52) U.S. Cl.
CPC ..... *G06Q 30/0204* (2013.01); *G06Q 30/0201* (2013.01); *H04L 67/02* (2013.01); *H04L 67/535* (2022.05)

(58) Field of Classification Search
None
See application file for complete search history.

(56) References Cited

U.S. PATENT DOCUMENTS 8,607,295 B2 12/2013 Bhatia et al.
8,631,473 B2 1/2014 Bhatia et al.
(Continued)

FOREIGN PATENT DOCUMENTS

| CN | 107087159 A | * 8/2017 | ........... H04N 17/004 |
|---|---|---|---|
| WO | 2012033669 | 3/2012 | |
| WO | 2014172472 | 10/2014 | |

OTHER PUBLICATIONS

Chen et al. "Competitions among OTT TV Platforms and Traditional Television in Taiwan: A Niche Analysis" (2017) (retrieved from https://www.econstor.eu/bitstream/10419/168477/1/Chen.pdf) (Year: 2017).*

(Continued)

*Primary Examiner* — Sujay Koneru
(74) *Attorney, Agent, or Firm* — Hanley, Flight and Zimmerman, LLC

(57) ABSTRACT

Methods, apparatus, and systems are disclosed to collect impressions associated with over-the-top media devices. An example apparatus includes memory; and at least one processor to execute instructions to access a first request, the first request from a user-controlled client device, the first request including an over-the-top device identifier that identifies an over-the-top device that presents media, in response to determining a user of the user-controlled client device is a panelist of a first server, store the over-the-top device identifier with demographics corresponding to the panelist, access a second request, the second request from the over-the-top device, the second request including the over-the-top device identifier and a media identifier, and log an impression associated with the media identifier and the demographics, the impression corresponding to the panelist of the first server.

18 Claims, 20 Drawing Sheets

Related U.S. Application Data continuation of application No. 14/823,621, filed on Aug. 11, 2015, now Pat. No. 10,410,230.

(60) Provisional application No. 62/192,915, filed on Jul. 15, 2015, provisional application No. 62/115,436, filed on Feb. 12, 2015, provisional application No. 62/109,585, filed on Jan. 29, 2015.

(51) Int. Cl.
*G06Q 30/0204* (2023.01)
*G06Q 30/0201* (2023.01)

(56) References Cited

U.S. PATENT DOCUMENTS

| | | | |
|---|---|---|---|
| 8,635,674 B2 | 1/2014 | Bhatia et al. | |
| 8,650,587 B2 | 2/2014 | Bhatia et al. | |
| 8,667,520 B2 | 3/2014 | Bhatia et al. | |
| 8,869,207 B1 | 10/2014 | Earle | |
| 8,910,195 B1 | 12/2014 | Barney et al. | |
| 8,932,124 B2 | 1/2015 | Lutnick et al. | |
| 8,955,001 B2 | 2/2015 | Bhatia et al. | |
| 8,978,086 B2 | 3/2015 | Bhatia et al. | |
| 9,154,821 B2 | 10/2015 | Davies | |
| 9,402,111 B2 | 7/2016 | Muller et al. | |
| 10,410,230 B2 | 9/2019 | Splaine et al. | |
| 10,937,043 B2 | 3/2021 | Splaine et al. | |
| 2009/0205000 A1* | 8/2009 | Christensen | H04N 21/433 725/115 |
| 2010/0151816 A1 | 6/2010 | Besehanic et al. | |
| 2010/0293566 A1* | 11/2010 | Valdez | H04N 21/8352 725/14 |
| 2011/0239243 A1* | 9/2011 | Dierks | H04N 21/812 725/24 |
| 2011/0283011 A1* | 11/2011 | Li | H04L 12/1439 709/231 |
| 2012/0019643 A1 | 1/2012 | Gideon et al. | |
| 2012/0047010 A1 | 2/2012 | Dowling et al. | |
| 2012/0066706 A1 | 3/2012 | Setos | |
| 2012/0239809 A1* | 9/2012 | Mazumdar | H04L 67/01 709/224 |
| 2013/0014136 A1 | 1/2013 | Bhatia et al. | |
| 2013/0014137 A1 | 1/2013 | Bhatia et al. | |
| 2013/0014138 A1 | 1/2013 | Bhatia et al. | |
| 2013/0014141 A1 | 1/2013 | Bhatia et al. | |
| 2013/0014143 A1 | 1/2013 | Bhatia et al. | |
| 2013/0014144 A1 | 1/2013 | Bhatia et al. | |
| 2013/0014145 A1 | 1/2013 | Bhatia et al. | |
| 2013/0014146 A1 | 1/2013 | Bhatia et al. | |
| 2013/0014153 A1 | 1/2013 | Bhatia et al. | |
| 2013/0014158 A1 | 1/2013 | Bhatia et al. | |
| 2013/0014222 A1 | 1/2013 | Bhatia et al. | |
| 2013/0014223 A1 | 1/2013 | Bhatia et al. | |
| 2013/0019258 A1 | 1/2013 | Bhatia et al. | |
| 2013/0019262 A1 | 1/2013 | Bhatia et al. | |
| 2013/0040633 A1* | 2/2013 | Leeder | H04W 4/21 455/422.1 |
| 2013/0117773 A1 | 5/2013 | Davies | |
| 2013/0198328 A1 | 8/2013 | Green et al. | |
| 2013/0219023 A1 | 8/2013 | Surianarayanan et al. | |
| 2013/0291001 A1 | 10/2013 | Besehanic et al. | |
| 2013/0311478 A1* | 11/2013 | Frett | G06Q 30/02 707/E17.014 |
| 2014/0020060 A1* | 1/2014 | Kotecha | H04L 67/61 726/3 |
| 2014/0081767 A1 | 3/2014 | Zhang | |
| 2014/0122697 A1* | 5/2014 | Liu | G06F 16/9535 709/224 |
| 2014/0173641 A1 | 6/2014 | Bhatia et al. | |
| 2014/0173643 A1 | 6/2014 | Bhatia et al. | |
| 2014/0317114 A1 | 10/2014 | Alla et al. | |
| 2014/0324544 A1 | 10/2014 | Donato et al. | |
| 2014/0337104 A1 | 11/2014 | Splaine et al. | |
| 2014/0351870 A1* | 11/2014 | Amine | H04H 20/00 725/92 |
| 2015/0120875 A1* | 4/2015 | Yao | H04N 21/23116 709/219 |
| 2015/0237395 A1 | 8/2015 | Barney et al. | |
| 2015/0319490 A1 | 11/2015 | Besehanic | |
| 2015/0339274 A1 | 11/2015 | Pappu et al. | |
| 2015/0347511 A1 | 12/2015 | Schmidt et al. | |
| 2015/0350291 A1* | 12/2015 | Contreras Murillo | H04L 65/612 709/219 |
| 2016/0050076 A1* | 2/2016 | Jin | H04W 4/50 705/44 |
| 2016/0182950 A1* | 6/2016 | Robinson | H04N 21/4415 725/28 |
| 2016/0225002 A1 | 8/2016 | Splaine et al. | |
| 2017/0006342 A1 | 1/2017 | Nagaraja Rao et al. | |
| 2017/0064411 A1 | 3/2017 | Goli et al. | |

OTHER PUBLICATIONS

International Searching Authority, "International Preliminary Report on Patentability," issued in connection with International Patent Application No. PCT/US2015/050978, dated Aug. 1, 2017, 5 pages.

International Searching Authority, "International Search Report," issued in connection with International Patent Application No. PCT/US2015/050978, dated Apr. 22, 2016, 3 pages.

International Searching Authority, "Written Opinion," issued in connection with International Patent Application No. PCT/US2015/050978, dated Apr. 22, 2016, 4 pages.

United States Patent and Trademark Office, "Notice of Allowance," issued in connection with U.S. Appl. No. 14/823,621, dated Jun. 17, 2019, 8 pages.

United States Patent and Trademark Office, "Pre-Brief Appeal Conference Decision," issued in connection with U.S. Appl. No. 14/823,621, dated May 28, 2019, 2 pages.

United States Patent and Trademark Office, "Final Office action," issued in connection with U.S. Appl. No. 14/823,621, dated Dec. 3, 2018, 16 pages.

United States Patent and Trademark Office, "Non-Final Office action," issued in connection with U.S. Appl. No. 14/823,621, dated Aug. 29, 2018, 17 pages.

United States Patent and Trademark Office, "Advisory action," issued in connection with U.S. Appl. No. 14/823,621, dated Aug. 6, 2018, 5 pages.

United States Patent and Trademark Office, "Final Office action," issued in connection with U.S. Appl. No. 14/823,621, dated May 29, 2018, 16 pages.

United States Patent and Trademark Office, "Non-Final Office action," issued in connection with U.S. Appl. No. 14/823,621, dated Feb. 12, 2018, 16 pages.

United States Patent and Trademark Office, "Notice of Allowance," issued in connection with U.S. Appl. No. 16/525,970, dated Oct. 21, 2020, 8 pages.

* cited by examiner

REGISTRATION PHASE

| OTT DEVICE ID | MAPPING ID | GENDER | AGE |
|---|---|---|---|
| A35Z | ASFD | M | 24 |
| A43Z | A2DF | M | 24 |
| A54Z | FASR | F | 25 |

DEMOGRAPHICS MAPPING TABLE

FIG. 5

AGGREGATE DEMOGRAPHICS SHARE

METHODS AND APPARATUS TO COLLECT IMPRESSIONS ASSOCIATED WITH OVER-THE-TOP MEDIA DEVICES

RELATED APPLICATIONS

This patent arises from a continuation of U.S. patent application Ser. No. 16/525,970, filed Jul. 30, 2019, which is a continuation of U.S. patent application Ser. No. 14/823,621 (Now U.S. Pat. No. 10,410,230), filed Aug. 11, 2015, which claims priority to Provisional Patent Application Ser. No. 62/109,585, filed Jan. 29, 2015, Provisional Patent Application Ser. No. 62/115,436, filed Feb. 12, 2015, and Provisional Patent Application Ser. No. 62/192,915, filed Jul. 15, 2015. U.S. patent application Ser. Nos. 16/525,970, 14/823,621, Provisional Patent Application Ser. Nos. 62/109,585, 62/115,436, and 62/192,915 are all incorporated herein by reference in their entireties.

FIELD OF THE DISCLOSURE

The present disclosure relates generally to monitoring media and, more particularly, to methods and apparatus to collect impressions associated with over-the-top media devices.

BRIEF DESCRIPTION OF THE DRAWINGS

FIG. 5 illustrates an example demographic mapping table to store demographics of audience members in association with corresponding OTT device identifiers.

DETAILED DESCRIPTION

Figure 1:
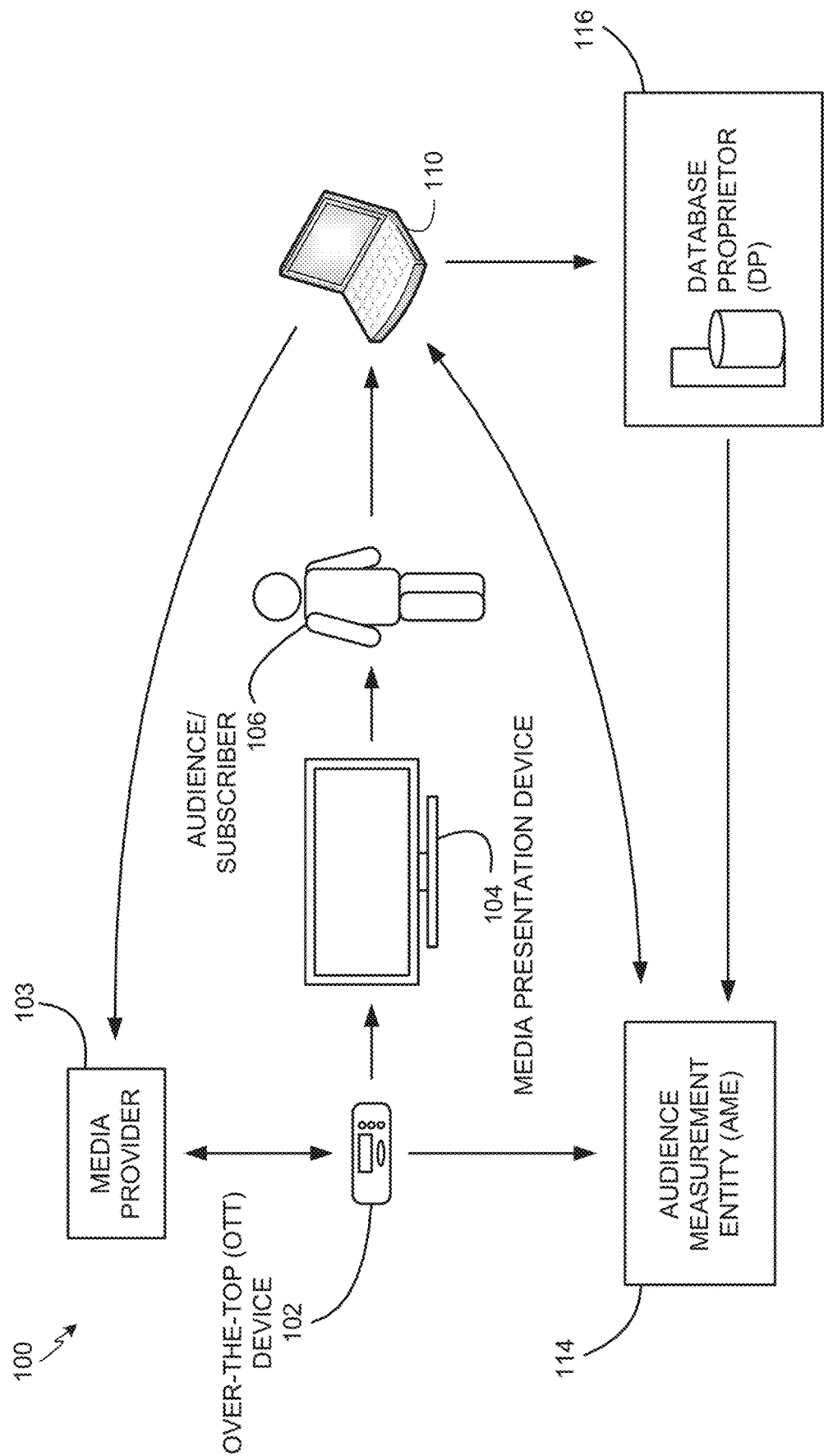
FIG. 1 illustrates an example system to register an over-the-top (OTT) device with an audience measurement entity (AME) and to collect impressions indicative of media being presented by the OTT device.

Techniques for monitoring user access to Internet-accessible media such as web pages, advertisements, content and/or other media have evolved significantly over the years. At one point in the past, such monitoring was done primarily through server logs. In particular, entities serving media on the Internet would log the number of requests received for their media at their server. Basing Internet usage research on server logs is problematic for several reasons. For example, server logs can be tampered with either directly or via automated (e.g., robotic, non-human, etc.) programs, which repeatedly request media from the server to increase the server log counts. Secondly, media is sometimes retrieved once, cached locally and then repeatedly viewed from the local cache without involving the server in the repeat viewings. Server logs cannot track these repeat views of cached media. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet media to be tracked is tagged with beacon instructions. In particular, monitoring instructions are associated with the hypertext markup language (HTML) of the media to be tracked. When a client requests the media, both the media and the beacon instructions are downloaded to the client. The beacon instructions are, thus, executed whenever the media is accessed, be it from a server or from a cache. In some examples, cache busters are used to prevent the browser from, when executing a beacon instruction, retrieving information from the client computer's local cache in response to the beacon instruction. Beacon instructions are embedded in media and, as such, may be used to track media impressions for corresponding media regardless of whether the media is retrieved from a server or is locally cached media that was previously retrieved from a server. That is, when media is retrieved from a server, the media includes the embedded beacon instructions. In addition, when the retrieved media is locally cached, the embedded beacon instructions still remain in the locally cached copy of the media. As such, when the locally cached media is subsequently presented again by a browser, the browser will execute the beacon instructions embedded in the locally cached media to enable tracking impressions for the media. Cache busters may be used to prevent a browser from reusing media stored in the local cache so that the client computer retrieves media from a server even if that media was previously cached locally.

The beacon instructions cause monitoring data reflecting information about the access to the media to be sent from the client that downloaded the media to a monitoring entity. Typically, the monitoring entity is an audience measurement entity (AME) that did not provide the media to the client and who is a trusted (e.g., neutral) third party for providing accurate usage statistics (e.g., The Nielsen Company, LLC). Advantageously, because the beaconing instructions are associated with the media and executed by the client browser whenever the media is accessed, the monitoring information is provided to the AME irrespective of whether the client is a panelist of the AME.

Audience measurement entities and/or other businesses often desire to link demographics to the monitoring information. To address this issue, the AME establishes a panel of users who have agreed to provide their demographic information and to have their Internet browsing activities monitored. When an individual joins the panel, they provide detailed information concerning their identity and demographics (e.g., gender, age, ethnicity, income, home location, occupation, etc.) to the AME. The audience measurement entity places an identifier (e.g., sets a cookie, sets a value in a HyperText Markup Language 5 (HTML5) datastore, etc.) on the panelist computer that enables the audience measurement entity to identify the panelist whenever the panelist accesses tagged media and, thus, sends monitoring information to the audience measurement entity.

Most of the clients providing monitoring information from the tagged media are not panelists and, thus, are unknown to the audience measurement entity. Accordingly, it is necessary to use statistical methods to impute demographic information based on the data collected for panelists to the larger population of users providing data for the tagged media. However, panel sizes of audience measurement entities remain small compared to the general population of users. Thus, a problem is presented as to how to increase panel sizes while ensuring the demographics data of the panel is accurate.

There are many database proprietors (sometimes referred to as "data enrichment providers") operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers, email providers, etc. such as Facebook, Myspace, Twitter, Yahoo!, Google, etc. These database proprietors set cookies or other device/user identifiers on the client devices of their subscribers to enable the database proprietor to recognize users when they visit the database proprietor's website.

The protocols of the Internet make cookies inaccessible outside of the domain (e.g., Internet domain, domain name, etc.) on which they were set. Thus, a cookie set, for example, in the amazon.com domain is accessible to servers in the amazon.com domain, but not to servers outside that domain. Therefore, although an audience measurement entity might find it advantageous to access the cookies set by the database proprietors, they are unable to do so.

The inventions disclosed in Mazumdar et al., U.S. Pat. No. 8,370,489, which is incorporated by reference herein in its entirety, enable an audience measurement entity to leverage the existing databases of database proprietors to collect more extensive Internet usage and demographic data by extending the beaconing process to encompass partnered database proprietors and by using such partners as interim data collectors. The inventions disclosed in Mazumdar et al. accomplish this task by structuring the AME to respond to beacon requests from clients (who may not be a member of an audience member panel and, thus, may be unknown to the audience member entity) and redirect the client from the audience measurement entity to a database proprietor such as a social network site partnered with the audience member entity. The redirection initiates a communication session between the client accessing the tagged media and the database proprietor. The database proprietor (e.g., Facebook) can access any cookie it has set on the client to thereby identify the client based on the internal records of the database proprietor. In the event the client corresponds to a subscriber of the database proprietor, the database proprietor logs an impression in association with the demographics data associated with the client and subsequently forwards logged impressions to the audience measurement company. In the event the client does not correspond to a subscriber of the database proprietor, the database proprietor may redirect the client to the audience measurement entity and/or another database proprietor. The audience measurement entity may respond to the redirection from the first database proprietor by redirecting the client to a second, different database proprietor that is partnered with the audience measurement entity. That second database proprietor may then attempt to identify the client as explained above. This process of redirecting the client from database proprietor to database proprietor can be performed any number of times until the client is identified and the media exposure logged, or until all database proprietor partners have been contacted without a successful identification of the client. The redirections all occur automatically so the user of the client is not involved in the various communication sessions and may not even know they are occurring.

Periodically or aperiodically the partnered database proprietors provide their logs and demographic information to the audience measurement entity which then compiles the collected data into statistical reports accurately identifying the demographics of persons accessing the tagged media. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the media access being logged as well as the identity of the media itself from the database proprietors (thereby protecting the privacy of the media sources), without compromising the ability of the database proprietors to log impressions for their subscribers. Further, when cookies are used as device/user identifiers, the Internet security cookie protocols are complied with because the only servers that access a given cookie are associated with the Internet domain (e.g., Facebook.com) that set that cookie.

The examples disclosed in Mazumdar et al. can be used to determine any type of media impressions or exposures (e.g., content impressions, advertisement impressions, content exposure, and/or advertisement exposure) using demographic information, which is distributed across different databases (e.g., different website owners, service providers, etc.) on the Internet. Not only do such disclosed examples enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social media sites such as Facebook, Twitter, Google, etc. Such extension effectively leverages the media tagging capabilities of the ratings entity and the use of databases of non-ratings entities such as social media and other websites to create an enormous, demographically accurate panel that results in accurate, reliable measurements of exposures to Internet media such as advertising and/or programming.

In illustrated examples disclosed herein, media exposure is measured in terms of online Gross Rating Points. A Gross Rating Point (GRP) is a unit of measurement of audience size that has traditionally been used in the television ratings context. It is used to measure exposure to one or more media (e.g., programs, advertisements, etc.) without regard to multiple exposures of the same media to individuals. In terms of television (TV) advertisements, one GRP is equal to 1% of TV households. While GRPs have traditionally been used as a measure of television viewership, examples disclosed herein may be used in connection with generating online GRPs for online media to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements, exposure to radio advertisements and online media, etc. Because examples disclosed herein may be used to correct impressions that associate exposure measurements with corresponding demographics of users, the information processed using examples disclosed herein may also be used by advertisers to more accurately identify markets reached by their advertisements and/or to target particular markets with future advertisements.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposures to those panelists and different demographic markets. Unlike traditional techniques in which audience measurement entities rely solely on their own panel member data to collect demographics-based audience measurements, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of the AME's demographics-based audience measurements. Such access also enables the audience measurement entity to monitor persons who would not otherwise have joined an audience measurement panel. Any entity having a network-accessible database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

To increase the likelihood that measured viewership is accurately attributed to the correct demographics, examples disclosed herein use demographic information located in the audience measurement entity's records as well as demographic information located at one or more database proprietors that maintain records or profiles of users having accounts therewith. In this manner, examples disclosed herein may be used to supplement demographic information maintained by a ratings entity (e.g., an AME such as The Nielsen Company of Schaumburg, Ill., United States of America, that collects media exposure measurements and/or demographics) with demographic information from one or more different database proprietors.

The use of demographic information from disparate data sources (e.g., high-quality demographic information from the panels of an audience measurement company and/or registered user data of web service providers) results in improved reporting effectiveness of metrics for digital advertising campaigns and/or media (e.g., downloaded and/or streamed video and/or audio media). Example techniques disclosed herein use online registration data to identify demographics and/or other segmentations (e.g., intention to buy a car, presences of children in the household, etc.) of users Additionally, example techniques disclosed herein use server impression counts, tagging (also referred to herein as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as database proprietors) maintain detailed demographic information collected via user registration processes. As used herein, demographic information includes characteristics (e.g., age, gender, geographic location, race, income level, education level, religion, etc.) that is used to segment a population. Demographic information may also include other information used to segment the population, such as, specific future plans (e.g., an intention to buy a car, an intention to travel aboard, etc.) and household characteristics (e.g., the presence of small children in the household, number of cars owned by the household, etc.). As used herein, an impression is defined to be an event in which a home or individual is exposed to corresponding media (e.g., content and/or an advertisement). Thus, an impression represents a home or an individual having been exposed to media (e.g., an advertisement, content, a group of advertisements, and/or a collection of content). In Internet media access, a quantity of impressions or impression count is the total number of times media (e.g., content, an advertisement or advertisement campaign) has been accessed by a web population (e.g., the number of times the media is accessed). As used herein, a demographic impression is defined to be an impression that is associated with a characteristic (e.g., a demographic characteristic) of the person exposed to the media.

FIG. 1 illustrates an example system 100 to register an over-the-top (OTT) device 102 with an AME 114 and/or a database proprietor (DP) 116, and to collect impressions from the OTT device 102. In the illustrated example, the OTT device 102 receives media from media providers 103 via the Internet over an Internet protocol (IP) connection. The example OTT device 102 may be any IP-based media delivery device capable of receiving, decoding, and presenting video, audio, and/or images. Example OTT devices 102 include a Roku media device, an AppleTV media device, a GoogleTV media device, a gaming console (e.g., a Microsoft Xbox gaming console, a Sony Playstation gaming console, etc.), a smart DVD player, an audio-streaming device, etc. The example OTT device 102 decodes media received from an example media provider 103 and outputs the decoded media to a media presentation device 104 for presentation. The example media presentation device 104 may be a television, a monitor, an audio receiver, an audio amplifier, etc. In some examples, the OTT device 102 is integrated in the media presentation device 104 (e.g., smart televisions, connected televisions, etc.).

In the illustrated example of FIG. 1, before using the OTT device 102 to stream media, the OTT devices 102 is registered with the media provider 103. The registration process allows the media providers 103 to activate media streaming services on the OTT device 102, associated the OTT device 102 with a separate media provider 103 account, and/or determine which media the OTT device 102 may stream. In the illustrated example, the OTT device ID may be an alphanumeric value (e.g., a device serial number, a unique hardware identifier (e.g., a Roku device ID), etc.) that uniquely identifies the OTT device 102. In some examples, the OTT device ID is assigned to the OTT device 102 when the OTT device 102 is manufactured. In some examples, the OTT device 102 cannot store and/or access third-party identifiers (e.g., DP cookies, AME identifiers, etc.). During a registration phase, the example OTT device 102 displays the OTT device ID on the example media presentation device 104, and an example audience subscriber 106 registers the OTT device 102 via an OTT registration website.

The audience member 106 of the illustrated example may be a head of household, and the AME 114 and/or the DP 116 may use the demographics of the audience member 106 to identify a likely profile of the household and/or demographics of other members living in the same household. In some examples, a household composition for the household of the audience member 106 may be modeled based on the demographics of the head of household (e.g., demographics of the audience member 106), media access characteristics (e.g., genre and/or volume of media being accessed in the household), location of the household (e.g., determined based on geolocation of IP address used by the household, etc.), and known panel family compositions indicated in panel data as likely to access a particular mix of media (e.g., TV shows and/or other programming) that substantially matches the media accessed in the household of the audience subscriber 106.

In the illustrated example, during the registration phase, when the example OTT device ID is registered at the example OTT registration website, the example OTT device ID is also communicated to the AME 114 and/or the DP 116 so that demographic information of the audience subscriber 106 can be associated with the media presented by the OTT device 102. In some examples, during the registration phase, the DP 116 receives the OTT device ID and a DP cookie corresponding to the audience subscriber 106. In some such examples, the DP 116 provides demographic information regarding the subscriber audience 106 to the AME 114. Details regarding the registration phase are disclosed in more detail below in connection with FIGS. 2, 3, and 4.

In the illustrated example of FIG. 1, the OTT device 102 sends an impression request with the OTT device 102 and a media identifier (media ID) to the AME 114 and/or the DP 116. The media ID may be a code, a signature, watermark information, a content management system (CMS) tag, or any other identifying information that the AME 114 predefines as being associated with particular media so that subsequently logged impressions based on the media ID (such as the impressions logged during the impression collection phase of FIG. 16) can be used to identify the particular corresponding media.

During an impression collection phase, the AME 114 collects impressions corresponding to media accessed via the OTT device 102. Examples disclosed herein may be used to collect impression information for any type of media including content and/or advertisements. Media may include advertising and/or content such as web pages, streaming video, streaming audio, movies, and/or any other type of content and/or advertisement deliver via satellite, broadcast, cable television, radio frequency (RF) terrestrial broadcast, Internet (e.g., Internet protocol television (IPTV)), television broadcasts, radio broadcasts and/or any other vehicle for delivering media. In some examples, media includes user-generated media that is, for example, uploaded to media upload sites such as YouTube and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

In some examples, the AME 114 logs the impression with the OTT device ID and corresponding demographics 118 based on the impression requests. The example AME 114 obtains from the demographics mapping table (e.g., the demographics mapping table 500 of FIG. 5) generated during the example registration phase. In some examples, the DP 116 logs the impression with the OTT device ID with corresponding demographics (e.g., demographics of a corresponding subscriber of the DP 116). In some examples, the AME 114 logs the impression with the OTT device ID and the corresponding demographics received from the DP 116. In addition, in some examples, instead of individual demographic information, the DP 116 provides demographic information corresponding to numerous audience members to the AME 114 that have viewed particular media. Details regarding the impression collection phase are disclosed in more detail below in connection with FIGS. 6-11.

Figure 2:
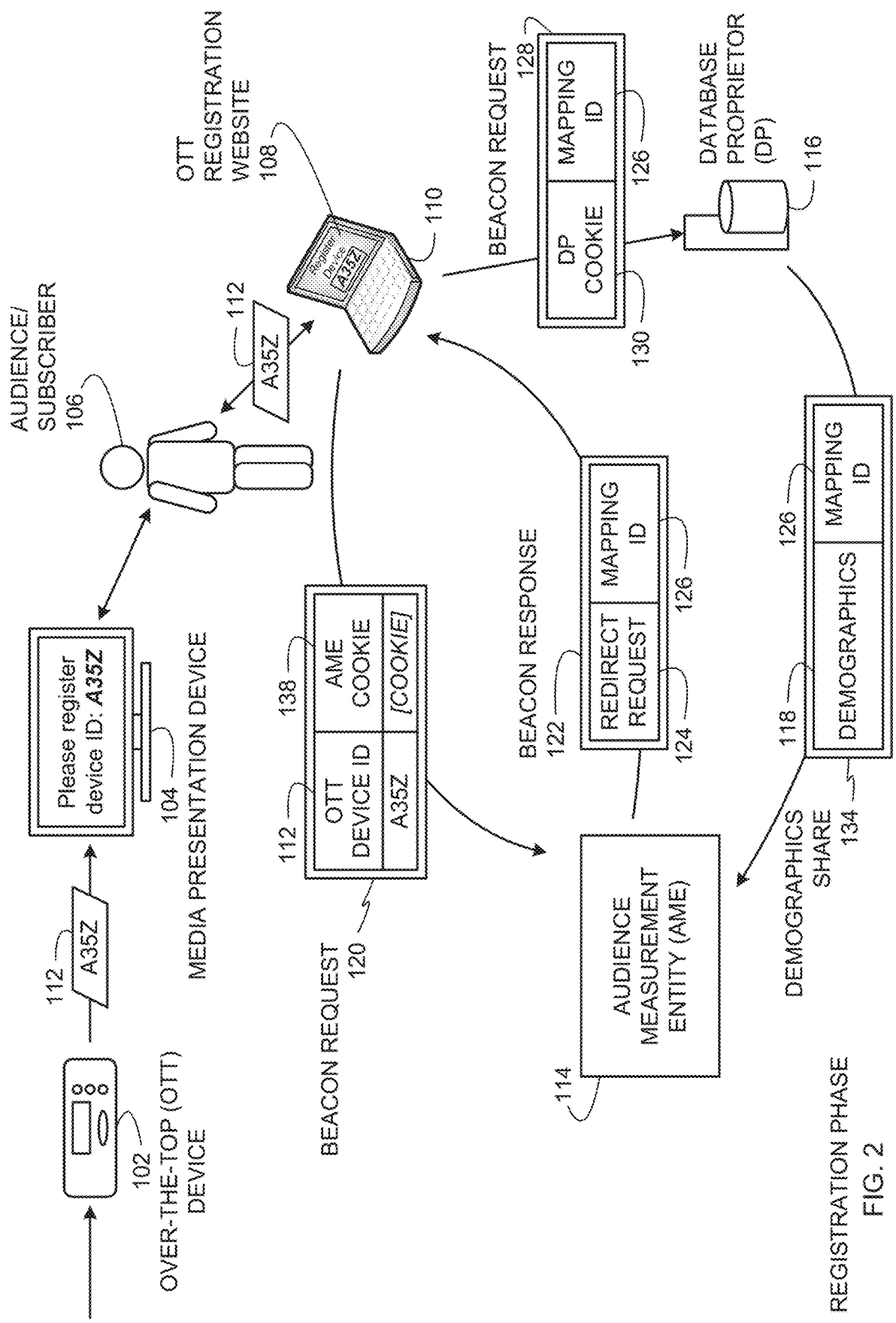
FIG. 2 illustrates an example registration phase to associate an identifier of the OTT device with demographics of an audience member that accesses media via the OTT device.

FIG. 2 illustrates an example registration phase to associate an identifier of an over-the-top (OTT) device 102 (e.g., a client device) with demographics of an audience member 106 that accesses media via the OTT device 102. The example of FIG. 2 may be used to collect demographic information about the audience member 106 based on an OTT registration process in which the audience member 106 registers the OTT device 102 through an OTT registration web site 108 to access one or more media delivery services via the OTT device 102. In the illustrated example, when the audience member 106 configures the OTT device 102 for use, the OTT device 102 displays OTT device registration instructions on the media presentation device 104. In the illustrated example, the OTT device registration instructions instruct the audience member 106 to navigate to the OTT registration website 108 using a computer such as an example client device 110 of FIG. 2. The client device 110 of the illustrated example may be any device capable of accessing information over a network. For example, the client device 110 may be a computer, a tablet, a mobile device, a smart television, or any other Internet-capable device or appliance. In the illustrated example, the OTT device registration instructions also provide an OTT device identifier (ID) 112 that the audience member 106 is to enter via the OTT registration website 108. In such examples, when the audience member 106 enters the OTT device ID 112 into the OTT registration website 108, the manufacturer or provider of the OTT device 102 links the OTT device 102 with a user account of the audience member 102 based on the OTT device ID 112. By making this association between the particular OTT device 102 and a user account, the audience member 106 is able to set up media-streaming services on the OTT device 102 and make purchases via the OTT device 102.

To monitor media accessed via the OTT device 102, an example AME 114 collects and stores the OTT device ID 112 of the OTT device 102 during the example registration phase of FIG. 2. In addition, the AME 114 partners with an example DP 116 to obtain demographics 118 corresponding to the audience member 106 from the DP 116. For example, the AME 114 also partners with the manufacturer or provider of the OTT device 102 that provides the OTT registration website 108 and, as part of the partnership, the AME 114 incorporates a tag or beacon instructions (described in greater detail below in connection with FIG. 12) on the OTT registration website 108 that cause the computer 110 to send a beacon request message 120 to the AME 114 to report the OTT device ID 112 to the AME 114. In the illustrated example, the AME 114 stores the OTT device ID 112 in a data structure such as an example demographics mapping table 500 of FIG. 5 to map the OTT device ID 112 with demographics information corresponding to the audience member 106.

In the illustrated example, in response to the beacon request 120, the AME 114 sends an example beacon response 122 to the computer 110. The beacon response 122 of the illustrated example includes an example redirect request 124 and an example mapping ID 126. The example redirect request 124 instructs the computer 110 to send a subsequent beacon request 128 to the DP 116 including an example DP cookie 130 and the example mapping ID 126.

In the illustrated example of FIG. 2, DP 116 uses the DP cookie 130 to identify the audience member 106 and retrieve demographic information 118 corresponding to the audience member 106 from, for example, a user account of the audience member 106 if the audience member 106 is a subscriber of the DP 116. In this manner, the DP 116 can send the demographics 118 of the audience member 106 to the AME 114 in, for example, a demographics share communication 134. In the illustrated example, the DP 116 is one of many DPs that operate on the Internet to provide services to large numbers of subscribers. Such services may be email services, social networking services, news media services, cloud storage services, streaming music services, streaming video services, online retail shopping services, credit monitoring services, etc. Example DPs include social network sites (e.g., Facebook, Twitter, MySpace, etc.), multi-service sites (e.g., Yahoo!, Google, etc.), online retailer sites (e.g., Amazon.com, Buy.com, etc.), credit reporting services (e.g., Experian) and/or any other web service(s) site that maintains user registration records. In examples disclosed herein, the DP 116 maintains user account records corresponding to users registered for Internet-based services provided by the DPs. That is, in exchange for the provision of services, subscribers register with the DP 116. As part of this registration, the subscribers provide detailed demographic information to the DP 116. Demographic information may include, for example, gender, age, ethnicity, income, home location, education level, occupation, etc. In the illustrated example, the DP 116 sets a device/user identifier (e.g., the DP cookie 130) on a subscriber's client device (e.g., the computer 110) that enables the DP 116 to identify the audience member 106 (e.g., a subscriber of the DP 116).

In the illustrated example, the AME 114 uses the mapping ID 126 to associate the demographics 118 received from the DP 116 to the OTT device ID 112 received from the computer 110. For example, when the AME 114 receives the beacon request 120 from the client device 120, the AME 114 generates and stores the mapping ID 126 in the example demographics mapping table 500 of FIG. 5 in association with the corresponding OTT device ID 112. In the illustrated example of FIG. 1, the AME 114 provides the mapping ID 126 in the beacon response 122 in association with the redirect request 124 so that the computer 110 can provide the mapping ID 126 in the beacon request 128 to the DP 116 in association with the DP cookie 130. In this manner, the DP 116 can associate the mapping ID 126 with the demographics 118 that correspond to the DP cookie 130. When the DP 116 provides the mapping ID 126 in association with the demographics 118 in the demographics share communication 134 to the AME 114, the AME 114 can use the mapping ID 126 in the demographics share communication 134 to associate the demographics 118 with the corresponding OTT device ID 112 in the example demographics mapping table 500 of FIG. 5. The example demographics mapping table 500 includes age and gender as the demographics 118. However, any additional or alternative demographics information may be used. In some examples, the mapping ID 126 may be the OTT device ID 112. However, the AME 114 may elect to obfuscate the OTT device ID 112 from the DP 116 and, as such, may elect to use a value for the mapping ID 126 that is different from the OTT device ID 112. In some examples, the mapping ID 126 may be a hash of the OTT device ID 112.

In the illustrated example of FIG. 2, the beacon request 120 also includes an AME cookie 138 set by the AME 114 in the computer 110. In some examples, the AME cookie 138 is used by the AME 114 to associate the OTT device ID 112 with panelist demographics previously collected by the AME 114 from the audience member 106 if the audience member is a panelist of the AME 114. For example, the AME 114 may establish an AME panel of users who have agreed to provide their demographic information and to have their media access activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., the AME cookie 122) on the person's computer 110 that enables the AME 114 to identify, for example, the audience member 106 (e.g., a panelist). An AME panel may be a cross-platform home television/computer (TVPC) panel built and maintained by the AME 114. In other examples, the AME panel may be a computer panel or Internet-device panel without corresponding to a television audience panel. In yet other examples, the AME panel may be a cross-platform radio/computer panel and/or a panel formed for other mediums.

Although some examples disclosed herein are described in connection with AME panel members and corresponding panelist demographics, in some examples, none or only some of the audience members of OTT devices are panel members of an AME panel. Examples disclosed herein are useful to collect demographics from DPs such as the DP 116 even when an audience member is not a panel member of the AME 114. In such examples, the AME 114 receives subscriber demographics from the DP 116 as disclosed herein without the AME 114 also supplying AME panelist demographics. In some examples, the AME 114 does not provide AME panelist demographics for impressions, and collects demographics only from DPs.

By associating the OTT device ID 112 with the demographics 118 from the DP 116 and/or panelist demographics from the AME 114 as shown in FIG. 5, the AME 114 can subsequently collect media impressions of media accessed by the OTT device 102 and log those media impressions in association with the demographics 118 based on the OTT device ID 112 of the OTT device 102. In the illustrated example, the AME 114 does not provide the media to the OTT device 102 and is a trusted (e.g., neutral) third party (e.g., The Nielsen Company, LLC) for providing accurate media access statistics.

Figure 3:
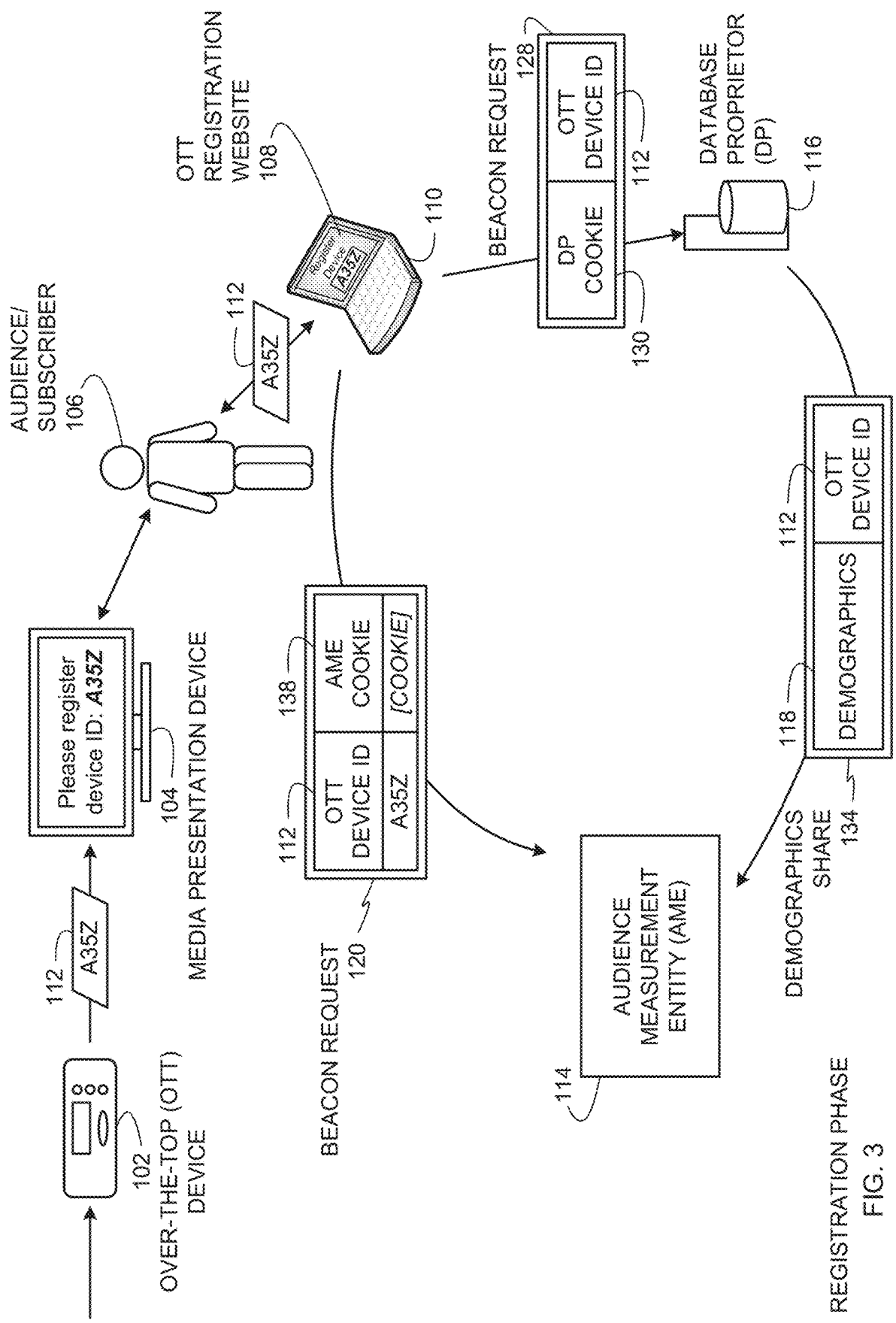
FIG. 3 illustrates another example over-the-top device registration phase to associate the example OTT device ID with demographics of the example audience member that accesses media via the example over-the-top device.

FIG. 3 illustrates another example OTT device registration phase to associate the example OTT device ID 112 with demographics of the example audience member 106 that accesses media via the example OTT device 102. The example OTT device registration phase of FIG. 2 differs from the example OTT device registration phase of FIG. 2 in that the example OTT device registration phase of FIG. 3 does not include the beacon response 122 of FIG. 2. In the illustrated example of FIG. 3, when the audience member 106 registers the OTT device ID 112 via the OTT registration website 108 using the computer 110, the computer 110 sends the beacon request 120 to the AME 114 as described above in connection with FIG. 2. In addition, the computer 110 also sends the example beacon request 128 to the DP 116. For example, in the example OTT device registration phase of FIG. 3, beacon instructions on the OTT registration website 108 instruct the computer to send the beacon request 120 to the AME 114 and the beacon request 128 to the DP 116 without needing a beacon response (e.g., the example beacon response 122 of FIG. 2) to prompt the computer 110 to send the beacon request 128. In the illustrated example of FIG. 3, the beacon request 128 includes the OTT device ID 112 in association with the DP cookie 130. In this manner, the DP 116 can use the DP cookie 130 to identify demographics of the audience member 106 based on a subscriber account of the audience member 106 that is associated with the DP cookie 130 at the DP 116. In any examples disclosed herein, the computer 110 may hash the OTT device ID 112 (e.g., using a seeded/salted one-way hash) before sending the OTT device ID 112 to the AME 114 and/or the DP 116. In some examples, the AME 114 may generate a seed (sometimes referred to as a "salt") used by the computer 110 to generate the one-way hash of the OTT device ID 112. In addition, the AME 114 may obtain the original value of the OTT device ID 112 and map the original value of the OTT device ID 112 to the hash of the OTT device ID 112. In this manner, the AME 114 can identify original OTT device IDs 112 based on previously created mappings and subsequently received OTT device ID hashes reported to the AME 114 by the OTT device 102 and other OTT devices in impression requests 302.

In some examples, the DP 116 sends the demographics share communication 134 to the AME 114 including user-level demographics 118 of the audience member 106 in association with the OTT device ID 112 as shown in FIG. 3 so that the AME 114 can log impressions corresponding to the OTT device 102 in association with the demographics 118. As used herein, user-level demographics are demographics that correspond to a particular person such as the audience member 106. In other examples, the DP 116 does not provide the user-level demographics 118 and, instead, provides example aggregate demographic impressions (e.g., the aggregate demographic impressions 1106 of FIG. 10) to the AME 114. In such examples, the DP 116 does not send the demographics share communication 134 to the AME 114. Instead, as described in connection with FIGS. 10 and 15, the OTT device 102 reports impressions to the DP 116, and the DP 116 logs impressions in association with the demographics 118 of the audience member 106. In this manner, the DP 116 can generate aggregate demographic impressions 1106 based on impressions logged from numerous OTT devices corresponding to numerous audience members, and send the aggregate demographic impressions 1106 to the AME 114 without providing any identifying information (e.g., the OTT device ID 112) that would reveal the identities of the individual audience members.

In some examples, the computer 110 does not send the beacon request 120 to the AME 114, but does send the beacon request 128 to the DP 116. In such examples, the DP 116 subsequently logs demographic impressions based on impression requests received from the OTT device 102 and other OTT devices, and the DP 116 generates aggregate demographic impressions 1106 that it provides to the AME 114.

Figure 4:
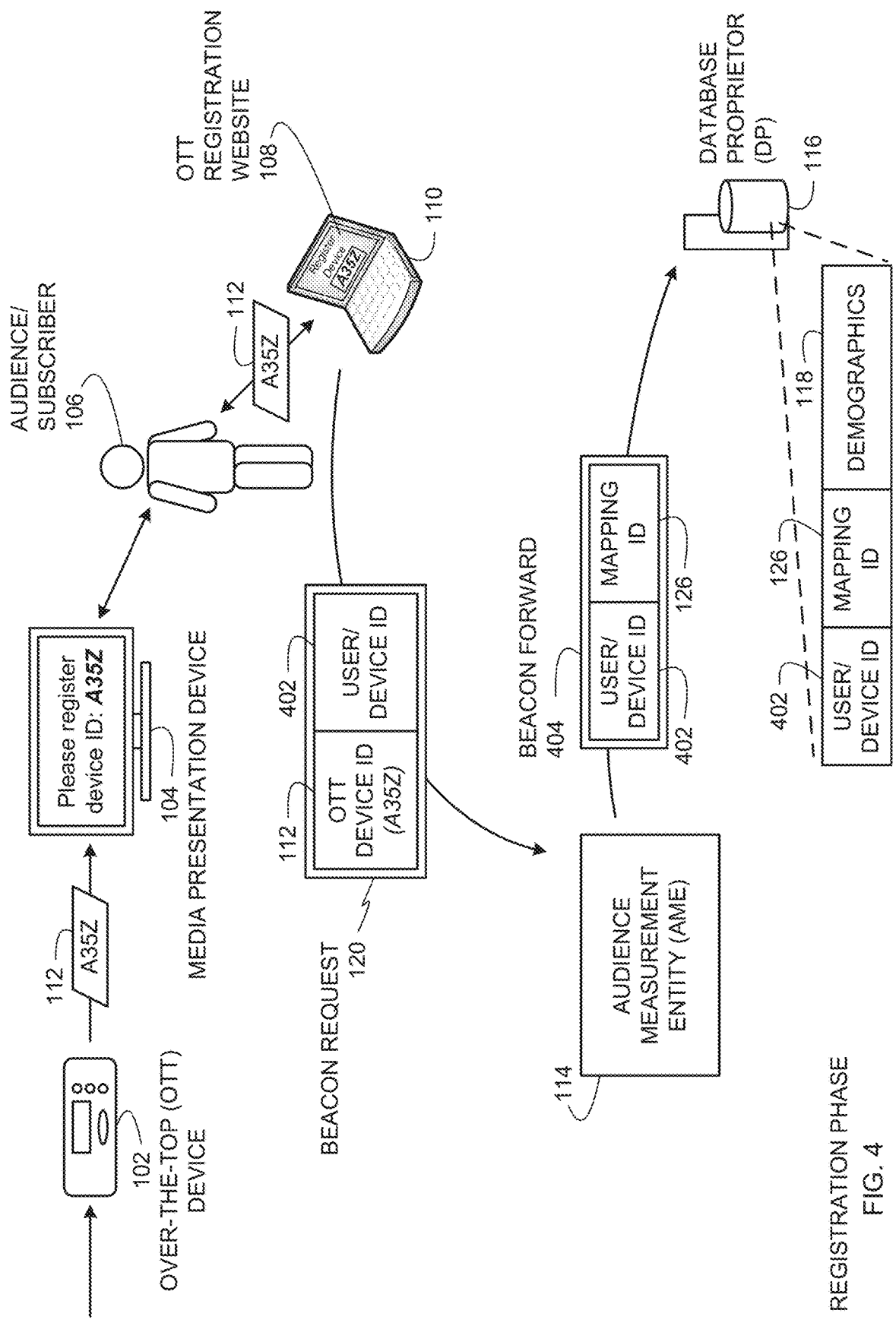
FIG. 4 illustrates another example over-the-top device registration phase to associate an identifier of the example OTT device with the demographics of the audience member that accesses media via the OTT device.

FIG. 4 illustrates another example OTT device registration phase to associate an identifier of the example OTT device 102 with the demographics 118 of the audience member 106 that accesses media via the OTT device 102. The example OTT device registration phase of FIG. 4 differs from the example OTT device registration phase of FIGS. 2 and 3 in that the example OTT device registration phase of FIG. 4 does not include the beacon request 128 of FIGS. 2 and 3 directly from the computer 110 to the DP 116. In the illustrated example of FIG. 4, when the audience member 106 registers the OTT device ID 112 via the OTT registration website 108 using the computer 110, the computer 110 sends the beacon request 120 to the AME 114 as described above in connection with FIG. 2. The example beacon request 120 of FIG. 4 is shown with a user/device ID 402. The user/device ID 402 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an email address, a telephone number, a credit card number, an Adobe Flash® client identifier, identification information stored in an HTML5 datastore, and/or any other identifier that the DP 116 stores in association with demographic information about one or more subscribers corresponding to the computer 110. In the illustrated example of FIG. 4, the AME 114 forwards the user/device ID 402 in association with a mapping ID 126 to the DP 116 using a beacon forward communication 404. The example DP 116 uses the user/device ID 402 to find the example demographics 118 corresponding to the audience member 106. For example, when the audience member 106 is a subscriber of the database subscriber 116, the database subscriber 116 will store account/profile information for the audience member 106 including the demographics 118 of the audience member 106. The DP 116 of the illustrated example stores the user/device ID 402 and the mapping ID 126 in association with the demographics 118 corresponding to the audience member 106.

Figure 6:
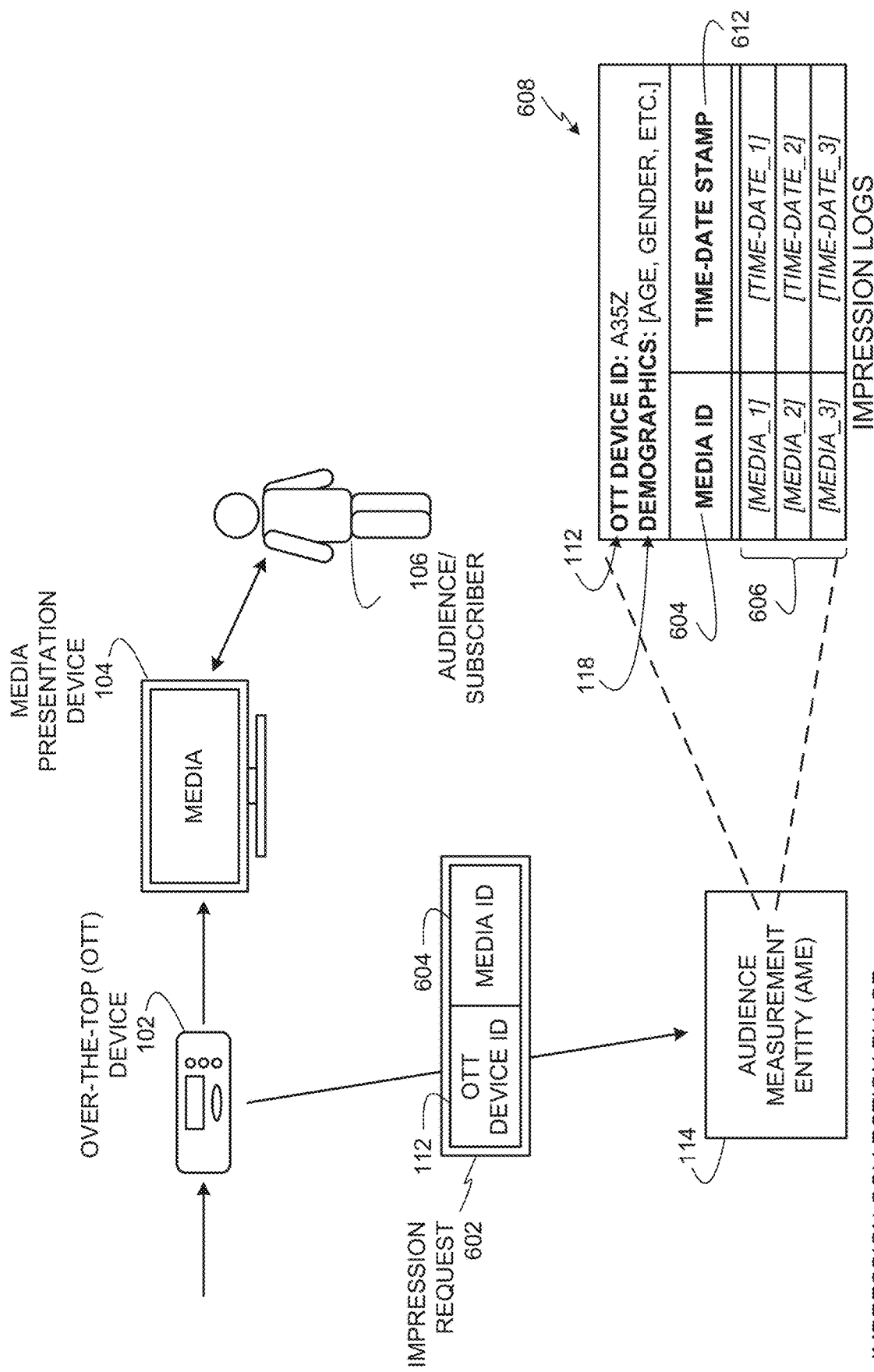
FIG. 6 illustrates an example impression collection phase to collect impressions corresponding to the OTT device of FIG. 2.

Turning to FIG. 6, during an example impression collection phase, the OTT device 102 employs media streaming applications (e.g., apps) and/or a web browser to access media, some of which include instructions that cause the OTT device 102 to report media monitoring information to the AME 114. That is, when the OTT device 102 of the illustrated example accesses media, an application and/or web browser of the OTT device 102 executes instructions in the media to send an impression request 602 to the AME 114 via, for example, the Internet or any other network. The impression request 602 of the illustrated example includes the OTT device ID 112 of the OTT device 102 and a media ID 604 that identifies the media accessed at the OTT device 102. The example impression request 602 allows the AME 114 to collect impressions for different media accessed via the OTT device 102. In this manner, the AME 114 can generate large impression quantities for different media (e.g., different content and/or advertisement campaigns).

In the illustrated example, when the AME 114 receives the impression request 602 from the OTT device 102, the AME 114 logs an example impression 606 in an example impression logs data structure 608 based on the OTT device ID 112. The example impression logs data structure 608 includes the OTT device ID 112 and the corresponding demographics 118, which the AME 114 obtains from the demographics mapping table 500 of FIG. 5 generated during the example registration phase described above in connection with FIG. 1. In some examples, the example demographics mapping table 500 may include AME panelist demographics in addition or instead of the demographics 118 from the DP 116. When the AME 114 receives the example impression request 602 with the OTT device ID 112 and the media ID 604, the AME 114 can log the impression 606 in the example impression logs data structure 608 in association with the corresponding demographics 118 based on the OTT device ID 112 in the impression request 602 matching the OTT device ID 112 in the example impression logs data structure 608. In this manner, the AME 114 can generate demographic impressions by associating demographic information with an impression for the media accessed at the OTT device 102. In the illustrated example, the example impressions 606 are logged in the example impression logs data structure 608 to associate the media ID 604 with a time-date stamp 612, the OTT device ID 112, and the demographics 118.

Figure 7:
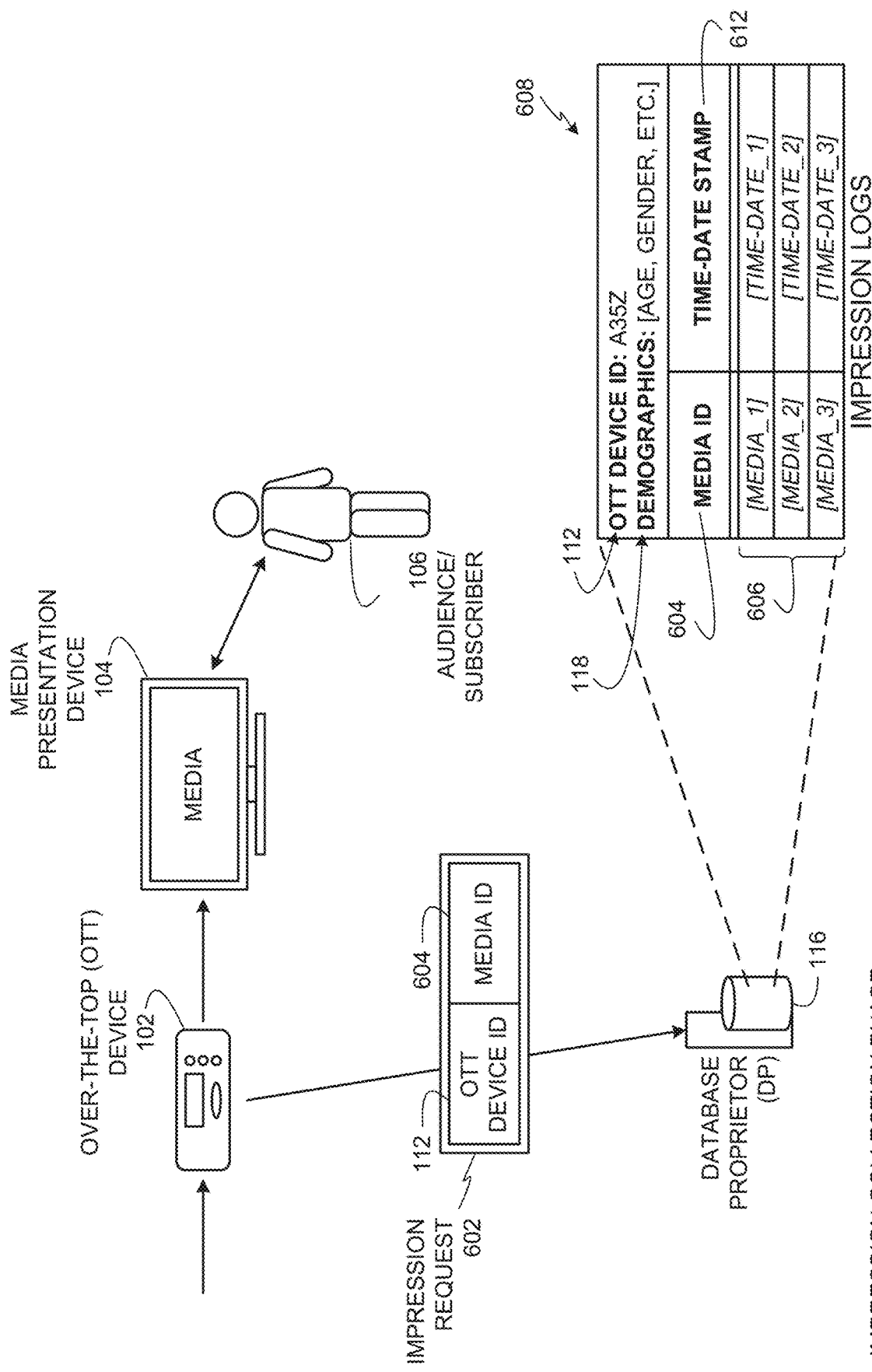
FIG. 7 illustrates another example impression collection phase in which the example database proprietor stores example demographics of an audience member in an example impression log data structure in association with a corresponding OTT device identifier.

FIG. 7 illustrates another example impression collection phase in which the example DP 116 stores example demographics 118 of the audience member 106 in the example impression log data structure 608 in association with the example corresponding OTT device ID 112. Unlike the impression collection phase of FIG. 6 in which the OTT device 102 reports impressions to the AME 114 using the impression request 602 of FIG. 6, in the example impression collection phase of FIG. 7, the OTT device 102 reports impressions to the DP 116 using an impression request 602. In the illustrated example, the example impression collection phase of FIG. 7 is used in connection with the example OTT device registration phase of FIG. 3 after the DP 116 receives the beacon request 128 of FIG. FIG. 3 that includes the OTT device ID 112 in connection with the DP cookie 130.

In the illustrated example of FIG. 7, the impression request 602 includes the OTT device ID 112 of the OTT device 102 in association with the media ID 604 of media accessed via the OTT device 102. The DP 116 of the illustrated example logs an impression 606 in the example impression logs data structure 608 based on the impression request 602. In this manner, the DP 116 can track media accesses over time corresponding to the demographics 118 of the audience member 106. As shown in the illustrated example of FIG. 10, the DP 116 uses the example impression logs data structure 608 corresponding to the audience member 106 in connection with numerous other impressions log data structures 1102, 1104 corresponding to other audience members to generate the example aggregate demographic impressions data structure 1106. The example aggregate demographic impressions data structure 1106 forms demographic groups defined by, for example, gender and age. For each demographic group, the example DP 116 aggregates impressions from user-level impressions logs (e.g., the impression logs data structure 608 of FIG. 6) corresponding to audience members having demographics that fall within that demographic group. In this manner, the DP 116 aggregates all of the impressions that it has logged for that demographic group. For example, for a demographic group of females, ages 18-25, the DP 116 aggregates all of the demographic impressions logged for a particular media ID 604 that correspond to female subscribers (e.g., audience members) of the DP 116 falling within the 18-25 age range. The DP 116 then stores the aggregate impressions for that demographic group in the example aggregate demographic impressions data structure 1106. The DP 116 can perform a similar aggregation process for each other demographic group defined for the example aggregate demographic impressions data structure 1106. The example DP 116 then communicates the aggregate demographic impressions data structure 1106 to the AME 114 instead of providing the user-level demographics 118 to the AME 114.

Figure 8:
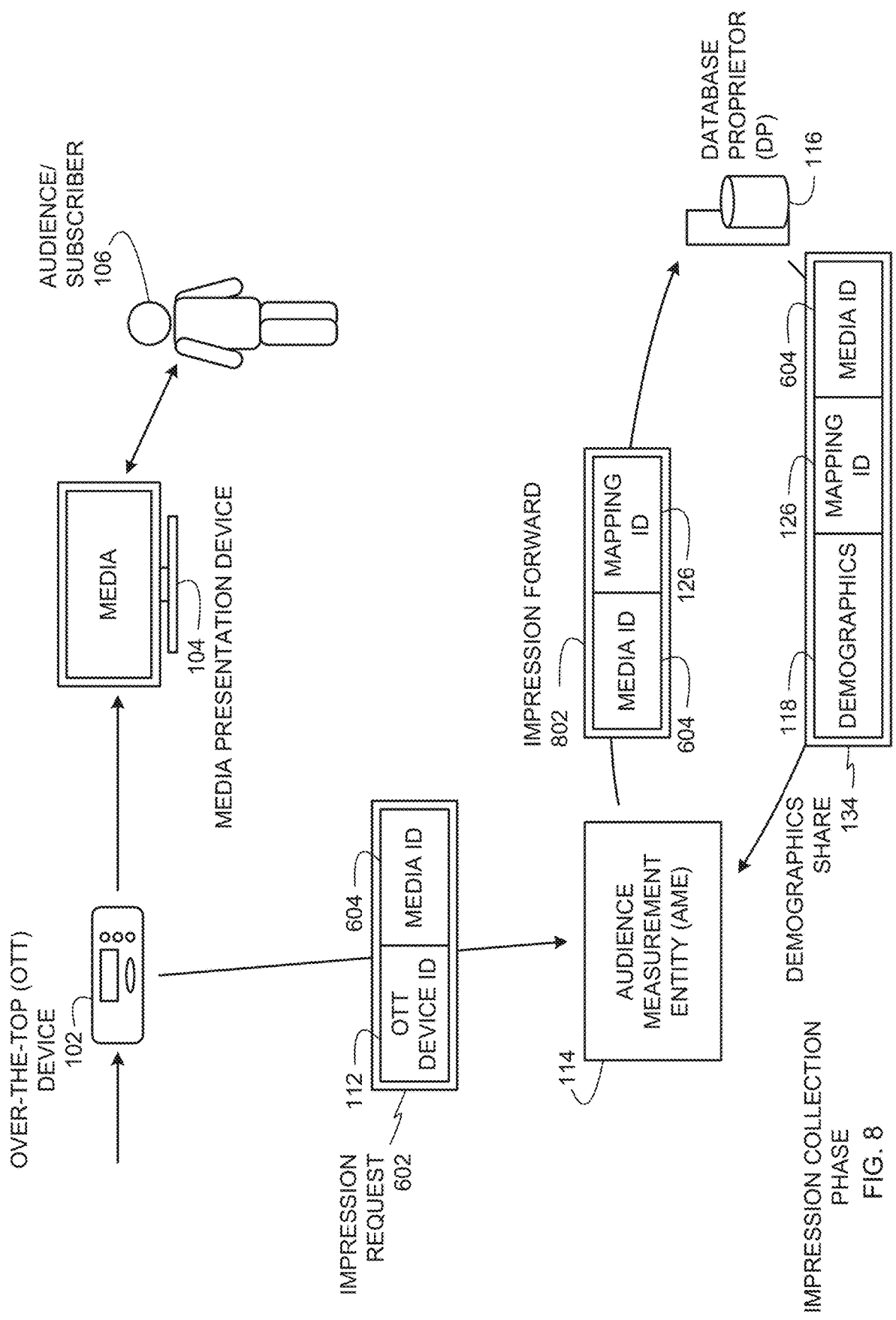
FIG. 8 illustrates another example impression collection phase in which the database proprietor provides demographics of an audience member to the AME in association with a corresponding media ID.

FIG. 8 illustrates another example impression collection phase in which the example DP 116 provides demographics of an audience member to the AME in association with a corresponding media ID 604. In the illustrated example of FIG. 8, when the audience member 106 accesses media via the OTT device 102, the OTT device 102 sends the OTT device ID 112 and the media ID 604 in the impression request 602 to the AME 114. The example AME 114 then sends the media ID 604 and the mapping ID 126 to the DP 116 in an impression forward communication 802. The DP 116 of the illustrated example uses the mapping ID 126 provided by the AME 114 to find the corresponding demographics 118 that the DP 116 stored in association with the mapping ID 126 during the OTT device registration phase of FIG. 4. The DP 116 then provides user-level demographics corresponding to the impression forward communication 802 to the AME 114. For example, the DP 116 sends the demographics 118, in association with the mapping ID 126 and the media ID 604 in the demographics share communication 134 to the AME 114. In this manner, the AME 114 can collect user-level or respondent-level demographics from the DP 116 in which demographics of individual users are associated with media IDs.

Figure 9:
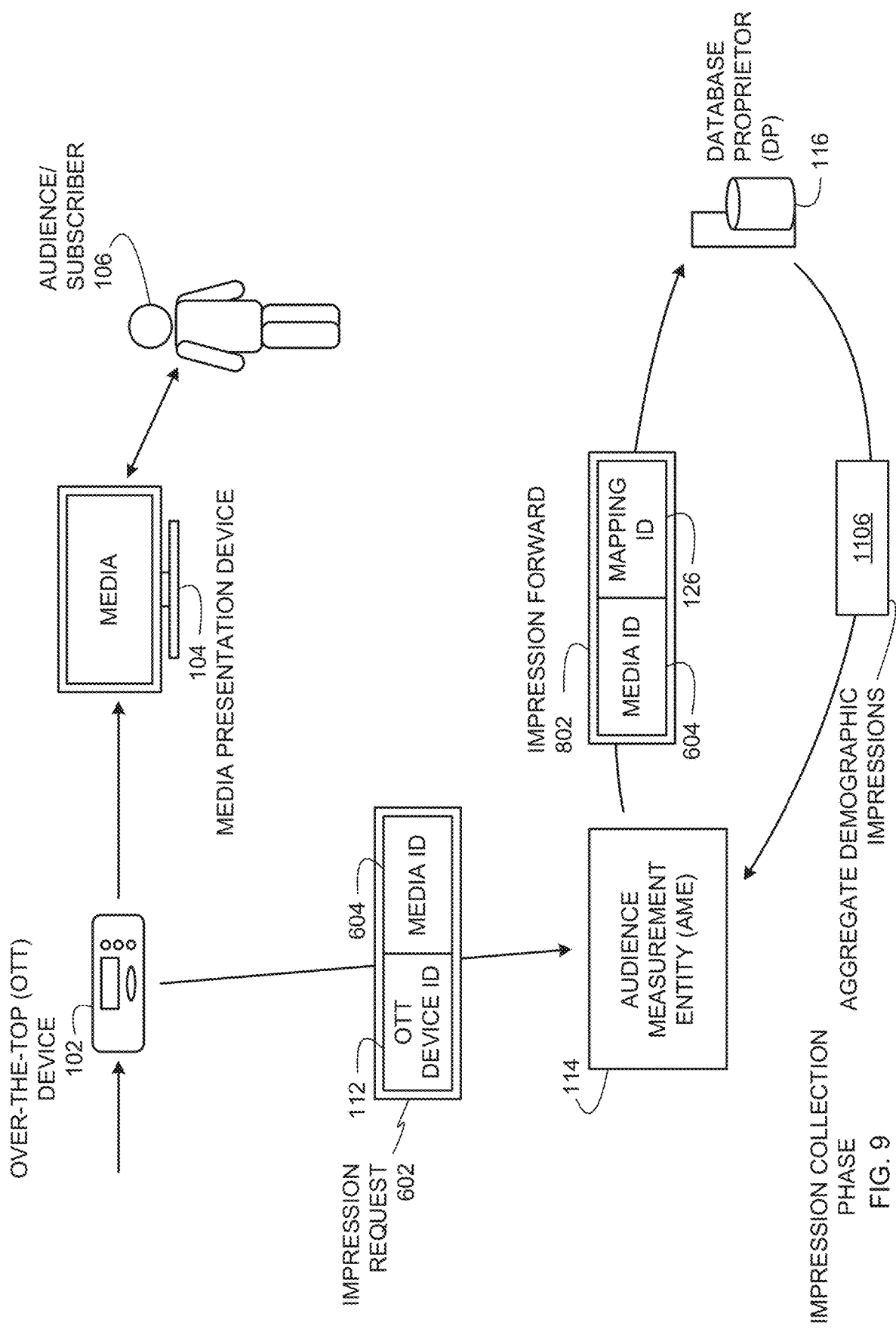
FIG. 9 illustrates another example impression collection phase in which the database proprietor provides aggregate demographic impressions corresponding to numerous audience members to the AME in association with corresponding media IDs.

In some examples, the DP 116 may instead send aggregate demographic impressions 1106 to the AME 116 instead of the user-level demographics of FIG. 8. For example, FIG. 9 illustrates another example impression collection phase in which the DP 116 provides the aggregate demographic impressions 1106 corresponding to numerous audience members to the AME 114 in association with corresponding media IDs. In the illustrated example of FIG. 9, after the DP 116 receives the impression forward communication 802 and numerous other impression forward communications from the AME 114 corresponding to the OTT device 102 and/or other OTT devices corresponding to other audience members, the DP 116 aggregates demographics of subscribers corresponding to logged impressions to form the aggregate demographic impressions 1106. The aggregate demographic impressions 1106 of the illustrated example may correspond to one media ID 604 or to numerous different media IDs. The DP 116 then sends the aggregate demographic impressions 1106 to the AME 114. In this manner, by aggregating demographic impressions, the DP 116 does not reveal demographics that can be used to identify any particular audience member at a user level. The aggregate demographic impressions 1106 are useful to the AME 114 to identify levels of impressions attributable to different demographic groups.

Although the impression collection phases of FIGS. 8 and 9 are described in connection with the OTT device registration phase of FIG. 4, the impression collection phases of FIGS. 8 and 9 may also be used in connection with the OTT device registration phases of FIGS. 2 and 3.

Figure 10:
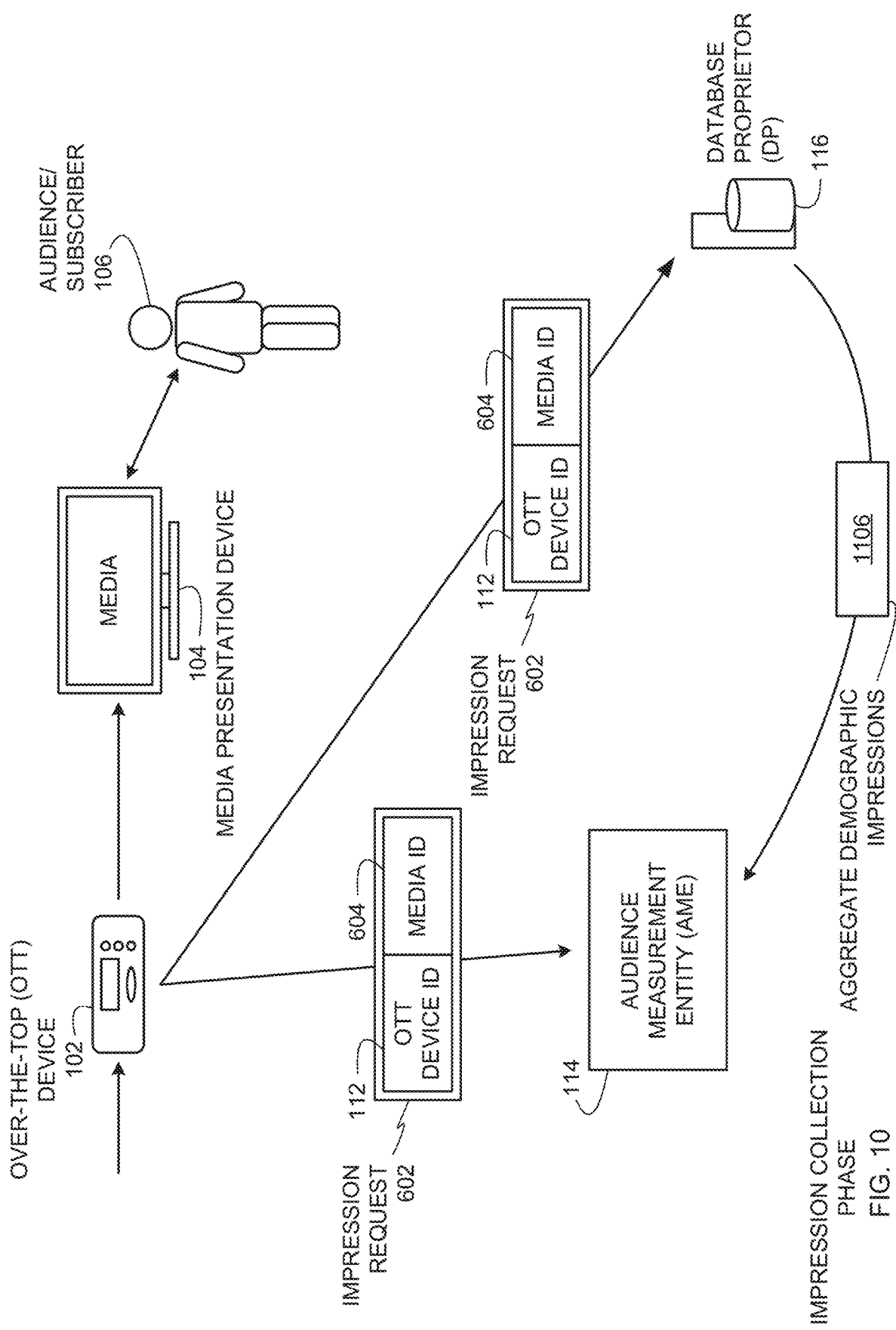
FIG. 10 illustrates another example impression collection phase in which the OTT device sends impression requests to the database proprietor and the database proprietor provides aggregate demographic impressions corresponding to numerous audience members to the AME in association with corresponding media IDs.

FIG. 10 illustrates another example impression collection phase in which the example DP 116 provides demographics of an audience member to the AME in association with a corresponding media ID 604. In the illustrated example of FIG. 10, when the audience member 106 accesses media via the OTT device 102, the OTT device 102 sends the OTT device ID 112 and the media ID 604 in the impression request 602 to the AME 114 and the DP 116. After the example DP 116 receives the impression request 602, the DP 116 aggregates demographics of subscribers corresponding to logged impressions to form the aggregate demographic impressions 1106. The aggregate demographic impressions 1106 of the illustrated example may correspond to one media ID 604 or to numerous different media IDs. The DP 116 then sends the aggregate demographic impressions 1106 to the AME 114. In this manner, the AME 114 may separately track the impression requests 602 received from OTT devices 102 and/or forward the impression requests 602 (e.g., via impression forward communication 802 of FIGS. 8 and 9) to a different DP 116. For example, a DP A may be configured to receive impression requests 602 directly from the OTT device 102 as illustrated in FIG. 10, while DP B may be configured to receive impression forward communications 802 from the AME 114 as illustrated in FIGS. 8 and 9.

Figure 12:
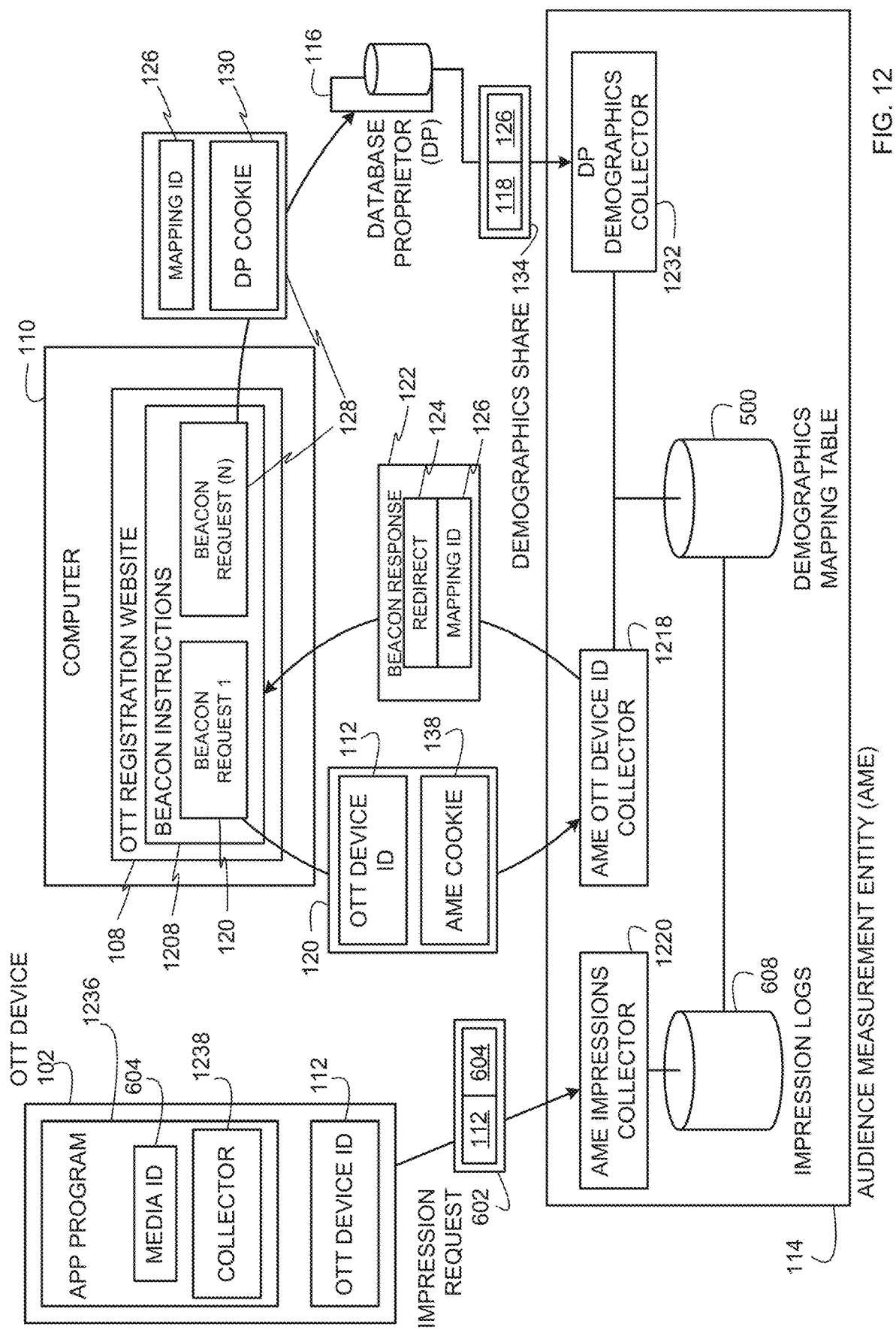
FIG. 12 illustrates an example apparatus to associate OTT device identifiers with audience demographics and to log impressions in association with corresponding OTT device identifiers.

FIG. 12 illustrates an example communication flow diagram of an example manner in which the AME 114 can collect the example demographics 118 of FIGS. 2, 5, and 6, and the example impressions 606 of FIG. 6 based on the beacon requests 120 and 128 from the client device 110 and based on the impression request 302 from the OTT device 102. The example chain of events shown in FIG. 12 occurs when the audience member 106 registers the OTT device 102 via the OTT registration website 108 on the computer 110 during the registration phase of FIG. 1 and when the OTT device 102 accesses media for which the OTT device 102 reports an impression to the AME 114 during the impression collection phase of FIG. 5.

In the illustrated example, when the audience member 106 registers the OTT device 102 via the computer 110, the computer 110 accesses the OTT registration website 108, which is tagged with beacon instructions 1208. The beacon instructions 1208 of the illustrated example may be implemented using javascript or any other types of instructions or script executable via a web browser including, for example, javascript, ActionScript, HTML, etc. The example beacon instructions 1208 cause the computer 110 to send the beacon request 120 to an AME impressions collector 1218 of the AME 114 when the computer 110 accesses the OTT registration website 108. For example, the beacon instructions 1208 may be embedded in media (e.g., an image, a pixel, a video, audio, etc.) rendered or presented in the OTT registration website 108. In the illustrated example, a web browser and/or app of the computer 110 executes the beacon instructions 1208 in the OTT registration website 108 which instruct the browser and/or app to generate and send the beacon request 120. In the illustrated example, the computer 110 sends the beacon request 120 to an example AME OTT device ID collector 1218 using a hypertext transfer protocol (HTTP) request or an HTTP Secure (HTTPS) request addressed to the uniform resource locator (URL) of the AME OTT device ID collector 1218 at, for example, a first Internet domain of the AME 114. In the illustrated example of FIG. 12, the beacon request 120 is a dummy request because its purpose is not to actually retrieve a webpage, but is instead to provide the OTT device ID 112 to the AME 114. The beacon request 120 of the illustrated example includes the OTT device ID 112 and the AME cookie 138. In the illustrated example, the AME cookie 138 that the computer 110 provides in the beacon request 120 is an AME ID because it corresponds to an identifier that the AME 114 uses to identify a panelist corresponding to the computer 110. In other examples, other identifiers instead of a cookie may be employed. In other examples, the computer 110 may not send the AME cookie 138 until the computer 110 receives a request for the same from a server of the AME 114 (e.g., in response to, for example, the AME OTT device ID collector 1218 receiving the beacon request 120). In some examples, the beacon request 120 also includes a site identifier (e.g., a URL) and/or a host website ID (e.g., www.acme.com) of the OTT registration website 108.

In some examples, instead of the AME cookie 138, another device/user identifier may be employed such as a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, an email address, and/or any other identifier that the AME 114 can store in association with demographic information about users of the OTT device 102.

In response to receiving the beacon request 120, the AME OTT device ID collector 1218 stores the OTT device ID 112 in the example demographics mapping table 500 of FIG. 5 in association with a corresponding mapping ID 126. In some examples, the AME OTT device ID collector 1218 also uses the AME cookie 138 in the beacon request 120 to identify AME panelist demographic information corresponding to the audience member 106 of the OTT device 102 if the audience member 106 is a panelist of the AME 114. In this manner, the AME OTT device ID collector 1218 can associate subsequently logged impression (e.g., the impressions 606 of FIG. 6) with panelist demographic information of the audience member 106 corresponding to the OTT device 102.

In some examples, the beacon request 120 does not include the AME cookie 138 if, for example, the audience member 106 of the OTT device 102 is not an AME panelist. In such examples, the AME 114 logs subsequent impressions regardless of whether the computer 110 provides the AME cookie 138 in the beacon request 120 (or in response to a request for the AME cookie 138). When the computer 110 does not provide the AME cookie 138, the AME 114 will still benefit from logging impressions for media accessed via the OTT device 102 even though the AME 114 will not have corresponding panelist demographics. For example, the AME 114 may receive the demographics 118 from the DP 116 to associate with logged impression if the audience member 106 is a subscriber of the DP 116. Additionally or alternatively, the AME 114 may still use the logged impression to generate a total impressions count and/or a frequency of impressions (e.g., an impressions frequency) for media accessed via the OTT device 102.

In the illustrated example of FIG. 12, to request the demographics 118 from one the DP 116, the AME OTT device ID collector 1218 returns a beacon response message 122 to the computer 110 including the redirect request 124 and the mapping ID 126. The example redirect request 124 may be an HTTP "302 Found" re-direct request and a URL of a participating DP 116 at, for example, a second Internet domain. In the illustrated example, the HTTP "302 Found" re-direct message in the beacon response 122 instructs the computer 110 to send the second beacon request 128 to the DP 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 128) to a participating DP 116. In the illustrated example, the AME OTT device ID collector 1218 determines the DP 116 specified in the beacon response 122 using a rule and/or any other suitable type of selection criteria or process. In some examples, the AME OTT device ID collector 1218 determines a particular DP to which to redirect a beacon request based on, for example, empirical data indicative of which DP is most likely to have demographic data for the audience member 106. In some examples, the beacon instructions 1208 include a predefined URL of one or more DPs to which the computer 110 should send follow-up beacon requests 128. In other examples, the same DP is always identified in the first redirect message (e.g., the beacon response 122).

In the illustrated example of FIG. 12, the beacon request 128 includes a DP cookie 130. The example DP cookie 130 includes a DP ID used by the DP 116 to identify the audience member 106 as a subscriber of the DP 116 to determine the demographics 118 of the audience member 106. In some instances (e.g., in which the DP 116 has not yet set a DP cookie 130 in the computer 110), the beacon request 128 does not include the DP cookie 130. In some examples, the DP cookie 130 is not sent until the DP 116 requests the same (e.g., in response to the beacon request 128). In some examples, instead of the DP cookie 130, any other user/device identifier is used to identify the audience member 106 such as a device identifier (e.g., an international mobile equipment identity (IMEI), a mobile equipment identifier (MEID), a media access control (MAC) address, etc.), a hardware device ID (e.g., a Roku device ID), a web browser unique identifier (e.g., a cookie), a user identifier (e.g., a user name, a login ID, etc.), an email address, a telephone number, a credit card number, an Adobe Flash® client identifier, identification information stored in an HTML5 datastore, and/or any other identifier that the DP 116 stores in association with demographic information about one or more subscribers corresponding to the computer 110. When the DP 116 receives the DP cookie 130, the DP 116 can obtain the demographic information 118 corresponding to the audience member 106 based on the DP cookie 130 that the DP 116 receives from the computer 110. In some examples, the DP ID included in the DP cookie 130 may be obfuscated (e.g., encrypted, hashed, etc.) at the computer 110 so that only an intended final recipient of the DP cookie 130 can use the hashed DP cookie 130. For example, the DP cookie 130 can be hashed so that only the DP 116 can use the DP cookie 130. If instead an IMEI number is used, the computer 110 can hash the IMEI number so that only a wireless carrier (e.g., the DP 116) can compare the hashed IMEI number to locally hashed IMEI numbers for use in identifying demographic information corresponding to the audience member 106 associated with the received hashed IMEI number. By hashing the DP cookie 130, an intermediate party (e.g., an intermediate server or entity on the Internet) receiving the beacon request 128 cannot directly identify the audience member 106.

Although only a single DP 116 is shown in FIGS. 2, 6, and 12 examples disclosed herein may be implemented using multiple DPs. In some such examples, the beacon instructions 1208 cause the computer 110 to send beacon requests 128 to numerous DPs. For example, the beacon instructions 1208 may cause the computer 110 to send the beacon requests 128 to the numerous DPs in parallel or in daisy chain (e.g., sequential) fashion. In some such examples, the beacon instructions 1208 cause the computer 110 to stop sending beacon requests 128 to DPs once a DP has recognized the computer 110 and is able to provide the demographics 118. In other examples, the beacon instructions 1208 cause the computer 110 to send beacon requests 128 to DPs so that multiple DPs can recognize the computer 110 and provide corresponding demographics 118 that the AME 114 can compile in the example demographics mapping table. In any case, multiple DPs are provided the opportunity to provide corresponding demographics if the audience member 106 of the computer 110 is a subscriber of services of those DPs.

In the illustrated example, a DP demographics collector 1232 of the AME 114 receives the demographics 118 and the mapping ID 126 in the demographics share communication 134 from the DP 116 and stores the received demographics 118 in the example demographics mapping table 500 with the corresponding OTT device ID 112 as shown in FIG. 5 based on the mapping ID 126 as described above in connection with FIGS. 2 and 3. In the illustrated example, after the DP demographics collector 1232 stores the demographics 118 in the demographics mapping table 500, the registration phase of FIG. 12 ends.

After the registration phase of FIG. 12 as described above in connection with FIG. 2, an AMP impressions collector 1220 of the AME 114 shown in FIG. 12 collects impressions of media presented at the OTT device 102. That is, the example AME impression collector 1220 receives the impression request 602 from the OTT device 102 when the OTT device 102 access media. In some examples, the OTT device 102 reports impressions for accessed media based on instructions (e.g., beacon instructions similar to the beacon instructions 1208) embedded in media that instruct the OTT device 102 (e.g., instruct a web browser or an app executed by the OTT device 102) to send impression requests (e.g., the impression request 602 of FIG. 6) to the AME 114. In such examples, the media having the beacon instructions is referred to as tagged media. In other examples, the OTT device 102 reports impressions for accessed media based on instructions embedded in apps or web browsers that execute on the OTT device 102 to send impression requests (e.g., the impression request 602) to the AME 114 for corresponding media accessed via those apps or web browsers. In any case, the impression requests (e.g., the impression request 602) includes the OTT device ID 112 to allow the corresponding AME 114 to associate demographic information with resulting logged impressions.

In the illustrated example of FIG. 12, the OTT device 102 access media via an app program 1236 installed on the OTT device 102. For example, the app program 1236 may be an app that is developed and provided by a media streaming service to which the audience member 106 (FIG. 1) subscribes. To access media using such subscription, the audience member 106 installs the app program 1236 on the OTT device 102. Such media streaming services and apps may be from media services such as Netflix, Amazon, Pandora, Vudu, etc. In the illustrated example, to send the impression request 602 from the OTT device 102 to the AME impression collector 1220, the app program 1236 is provided with an example collector 1238. The collector 1238 of the illustrated example a program of instructions and/or libraries incorporated into the app program 1236 by a developer of the app program 1236. For example, the AME 114 may provide the developer of the app program 1236 with a software development kit (SDK) that includes functions, application programming interfaces (APIs), and/or libraries that the developer can use to include the collector 1238 in the app program 1236. In this manner, when the app program 1236 is installed and used on the OTT device 102, the collector 1238 operates to collect the OTT device ID 112 of the OTT device 102 and to collect the media ID 604 corresponding to media accessed via the app program 1236. In addition, the collector sends the OTT device 112 in association with the media ID 604 in the impression request 602 to the example AME impression collector 1220 at the AME 114. When the AME impression collector 1220 of the illustrated example receives the impression request 602, the AME impression collector 1220 logs an impression (e.g., an impression 606 of FIG. 6) in the impression logs data structure 608 as described above in connection with FIG. 6. For example, the AME impression collector 1220 logs an impression by storing the media ID 604 in association with the demographics 118 in the demographics mapping table 500 based on the OTT device ID 112 in the impression request 602 matching the same OTT device ID 112 stored in association with the demographics 118 in the demographics mapping table 500.

Additional examples that may be used to implement the beacon instruction processes of FIG. 12 are disclosed in Mazumdar et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

Figure 13:
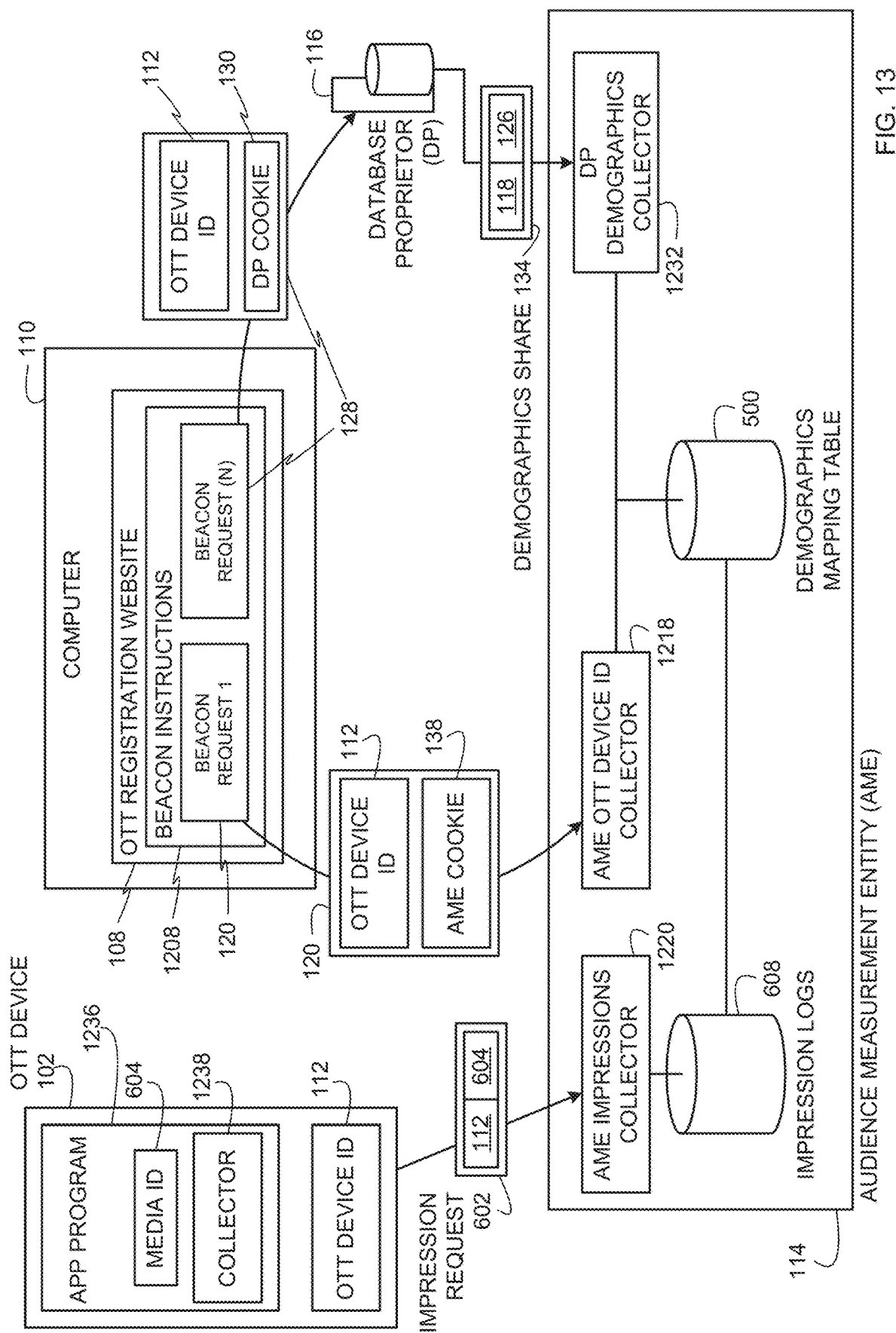
FIG. 13 illustrates another example configuration of the example apparatus to log demographic impressions in association with corresponding OTT device identifiers.

FIG. 13 illustrates another example configuration of the example system of FIG. 12 to log demographic impressions in association with corresponding OTT device IDs 112. The example configuration of FIG. 13 may be used in connection with the example OTT device registration phase of FIG. 2 to send the OTT device ID 112 in association with the DP cookie 130 from the computer 110 to the DP 116 without needing the AME 114 to send the example beacon response 122 of FIG. 1 to the computer 110. In the illustrated example of FIG. 13, the AME OTT device ID collector 1218 of the AME 114 receives the beacon request 120 from the computer 110 including the OTT device ID 112 and the AME cookie 138. In addition, without needing the AME OTT device ID collector 1218 to send the example beacon response 122 to the computer 110, as shown in FIG. 12, the beacon instructions 1208 in the OTT registration website 108 cause the computer 110 to send the beacon request 128 to the DP 116.

In the illustrated example, the beacon request 128 includes the OTT device ID 112 in association with the DP cookie 130. In the illustrated example of FIG. 13, the DP demographics collector 1232 receives the demographics 118 of the audience member 106 in association with the OTT device ID 112 in the demographics share communication 134 from the DP 116. The DP demographics collector 1232 of the illustrated example stores the demographics 118 in association with the corresponding OTT device ID 112 in the demographics mapping table 500. As described above in connection with FIG. 12, the example AME impressions collector 1220 receives the impression request 602 from the OTT device 102 and logs a corresponding impression 606 (FIG. 6) in the impression logs data structure 608.

Figure 11:
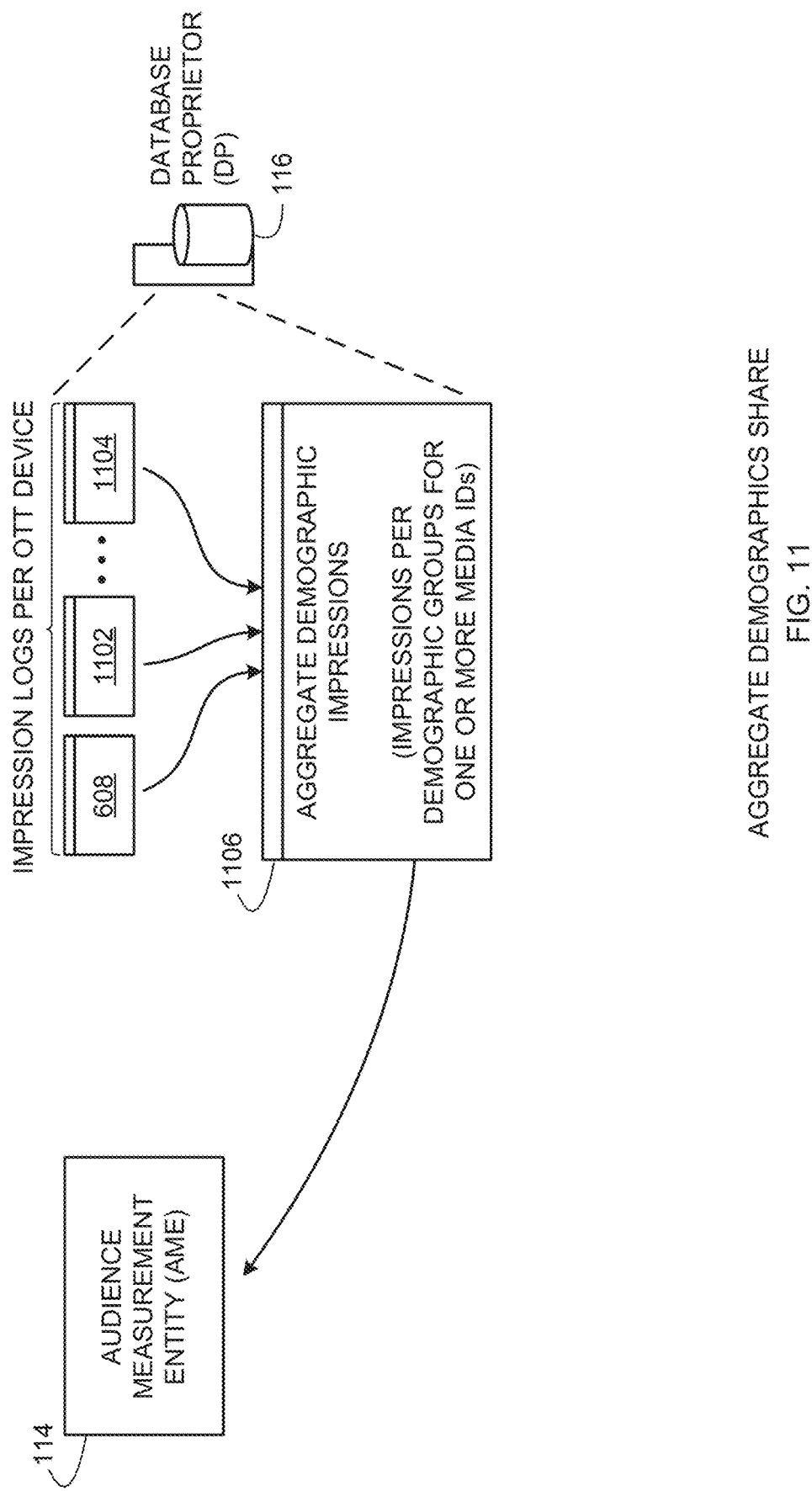
FIG. 11 illustrates an example aggregate demographic impressions data structure generated by an example database proprietor to store aggregate demographic impressions based on impressions collected by the database proprietor.
Figure 14:
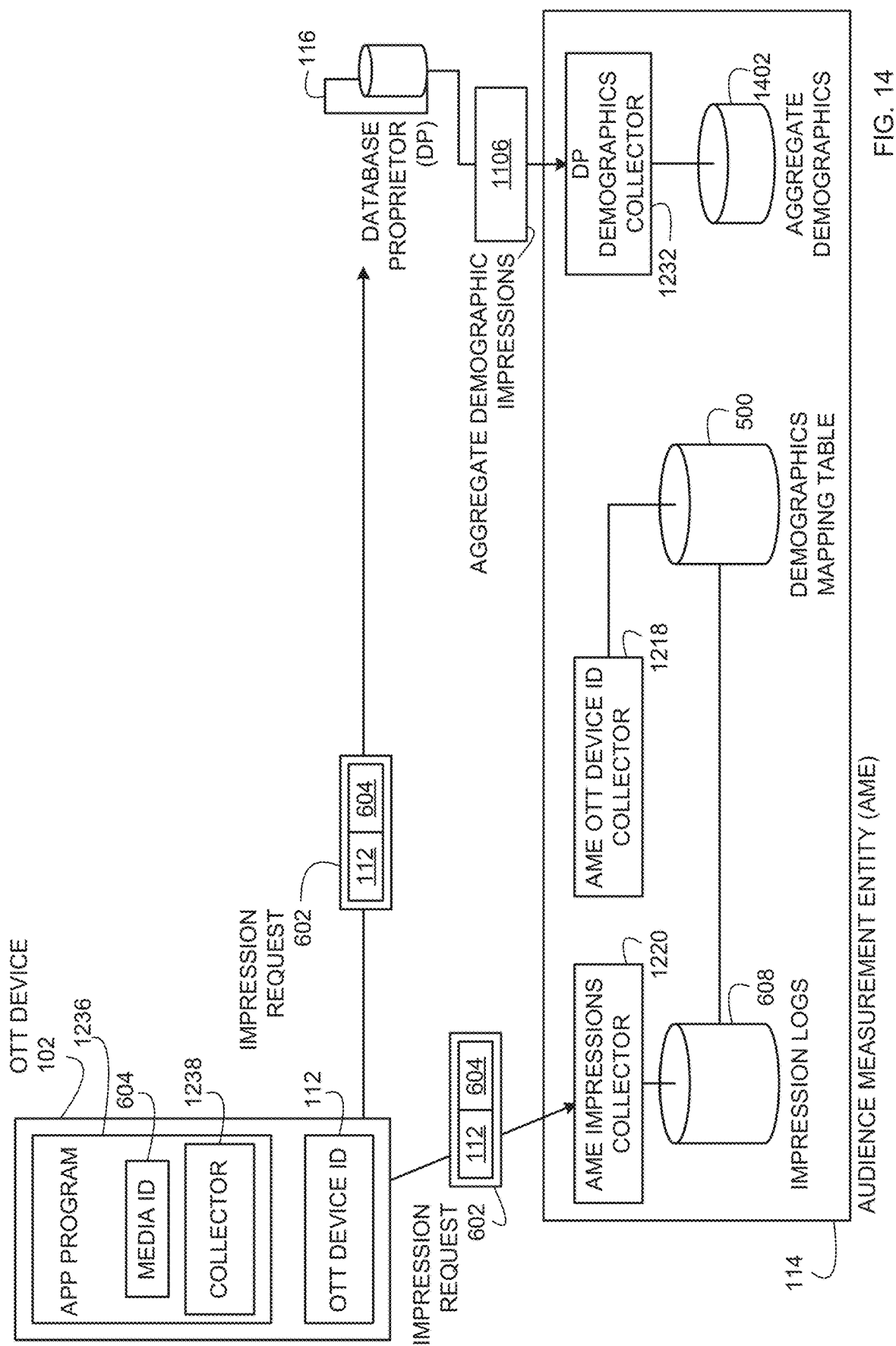
FIG. 14 illustrates another example apparatus to generate aggregate demographic impressions based on impressions associated with OTT device identifiers.

FIG. 14 illustrates another example apparatus to generate the example aggregate demographic impressions 1106 of FIG. 11 based on impressions associated with the OTT device ID 112 and numerous other OTT device IDs (e.g., the OTT device ID 112). The example configuration of FIG. 14 may be used to collect impressions during an impression collection phase after the example OTT device registration phase of FIG. 3 in which the computer 110 sends the OTT device ID 112 in association with the DP cookie 130 in the beacon request 128 to the DP 116 so that the DP 116 can associate the OTT device ID 112 with corresponding demographics 118 based on the DP cookie 130. In the illustrated example of FIG. 14, the collector 1238 in the OTT device 102 sends impression requests 602 to the DP 116 and to the AME 114. The impression request 602 of the illustrated example includes the example OTT device ID 112 and the example media ID 604. In this manner, the DP 116 logs an impression for the media ID 604 based on the OTT device ID 112. In addition, the DP 116 logs other impressions from subsequent impressions requests 602 received from the OTT device 102 and other OTT devices corresponding to other audience members. At some time, the DP 116 generates the aggregate demographic impressions 1106 as described above in connection with FIGS. 9 and 10, and sends the aggregate demographic impressions 1106 to the DP demographics collector 1232.

In the illustrated example of FIG. 14, the AME impressions collector 1220 logs user-level impressions in the impression logs 608 based on impression requests 602 received from the OTT device 102 and other OTT devices. For instances in which users of the OTT devices are also panelists of the AME 114, the AME impressions collector 1220 logs the user-level impressions in the impression logs 608 in association with demographics stored by the AME 114 for corresponding panelists. For example, the AME 114 may identify corresponding demographics for the OTT device ID 112 based on the AME cookie 138 received by the AME OTT device ID collector 1218 as shown in FIG. 13.

Also in the illustrated example, the DP demographics collector 1232 receives the aggregate demographic impressions 1106 from the DP 116 and stores the aggregate demographic impressions 1106 in an example aggregate demographics data structure 1402. In some examples, the AME 114 performs statistical analysis of the aggregate demographic impressions in the example aggregate demographics data structure 1402 based on user-level demographic impressions in the example impression logs 608 logged by the AME 114. For example, the AME 114 may adjust demographics and/or impression distributions in the aggregate demographics data structure 1402 to correct (e.g. calibrate) for any errors associated with the DP 116 having inaccurate demographics of registered subscribers. For example, subscribers of the DP 116 may purposefully provide inaccurate demographic information to the DP 116 (e.g., to hide/protect personal information/identities, or due to accidental entry of inaccurate information). In this manner, the AME 114 can generate large amounts of relatively accurate demographic impressions for different media based on user-level impressions collected by the AME 114 and based on aggregate demographic impressions collected from the DP 116.

Figure 15:
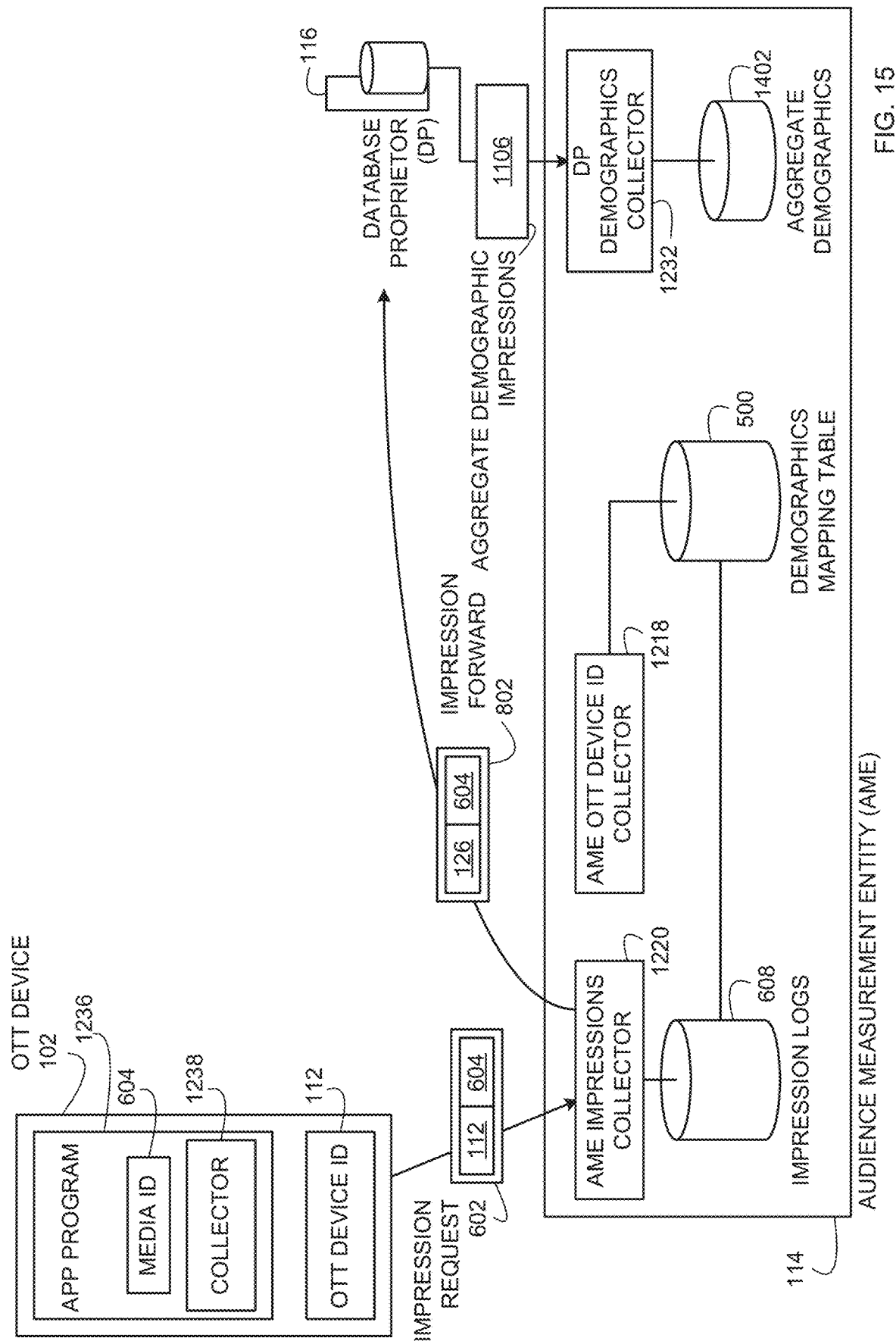
FIG. 15 illustrates another example apparatus to generate aggregate demographic impressions based on impressions associated with OTT device identifiers received from the AME.

In some alternative examples, the collector 1238 at the OTT device 102 does not send impression requests 602 to the DP 116. FIG. 15 illustrates example where the AME impressions collector 1220 of the AME 114 sends an impression forward communication 802 to the DP 116 so that the DP 116 can log demographic impressions. In the illustrated example of FIG. 15, the AME impressions collector 1220 replaces the OTT device ID 112 with the mapping ID 126. In such examples, the DP 116 generates the aggregate demographic impressions 1106 based on the impression requests forwarded by the AME 114. The example DP 116 provides the aggregate demographic impressions 1106 to the DP demographics collector 1232 to be analyzed as described above in connection with FIG. 14.

While example manners of implementing the example demographics mapping table 500, the example impression logs data structure 608, the example AME OTT device ID collector 1218, the example AME impressions collector 1220, and the example DP demographics collector 1232 are illustrated in FIGS. 12, 13, 14, and/or 15, one or more of the elements, processes and/or devices illustrated in FIGS. 12, 13, 14, and/or 15 may be combined, divided, re-arranged, omitted, eliminated and/or implemented in any other way. Further, the example demographics mapping table 500, the example impression logs data structure 608, the example AME OTT device ID collector 1218, the example AME impressions collector 1220, and/or the example DP demographics collector 1232 of FIGS. 12, 13, 14, and/or 15 may be implemented by hardware, software, firmware and/or any combination of hardware, software, and/or firmware. Thus, for example, any of the example demographics mapping table 500, the example impression logs data structure 608, the example AME OTT device ID collector 1218, the example AME impressions collector 1220, and/or the example DP demographics collector 1232 could be implemented by one or more analog or digital circuit(s), logic circuits, programmable processor(s), application specific integrated circuit(s) (ASIC(s)), programmable logic device (s) (PLD(s)), and/or field programmable logic device(s) (FPLD(s)). When reading any of the apparatus or system claims of this patent to cover a purely software and/or firmware implementation, at least one of the example demographics mapping table 500, the example impression logs data structure 608, the example AME OTT device ID collector 1218, the example AME impressions collector 1220, and/or the example DP demographics collector 1232 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographics mapping table 500, the example impression logs data structure 608, the example AME OTT device ID collector 1218, the example AME impressions collector 1220, and/or the example DP demographics collector 1232 of FIGS. 12, 13, 14, and/or 15 may include one or more elements, processes and/or devices in addition to, or instead of, those illustrated in FIGS. 12, 13, 14, and/or 15, and/or may include more than one of any or all of the illustrated elements, processes and devices.

FIGS. 16, 17, 18, and 19 are flow diagrams representative of example machine readable instructions that may be executed to implement the example AME OTT device ID collector 1218, the DP demographics collector 1232, and the AME impressions collector 1220 of FIGS. 12, 13, 14, and/or 15 to associate OTT device IDs 112 (FIGS. 2-12) with demographics 118 (FIGS. 2-12) of audience members 106 (FIGS. 1-4 and 6-10) during the registration phase of FIGS. 2-4 and to log impressions 606 (FIG. 6) in association with corresponding OTT device IDs 112 during the impression collection phase of FIGS. 6-10. In these examples, the machine readable instructions comprise one or more programs for execution by a processor such as the processor 2012 shown in the example processor platform 2000 discussed below in connection with FIG. 20. The program(s) may be embodied in software stored on a tangible computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example programs are described with reference to the flowcharts illustrated in FIGS. 16-19, many other methods of implementing the example AME OTT device ID collector 1218, the DP demographics collector 1232, and/or the AME impressions collector 1220 may alternatively be used. For example, the order of execution of the blocks may be changed, and/or some of the blocks described may be changed, eliminated, or combined.

As mentioned above, the example processes of FIGS. 16-19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 16-19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 16:
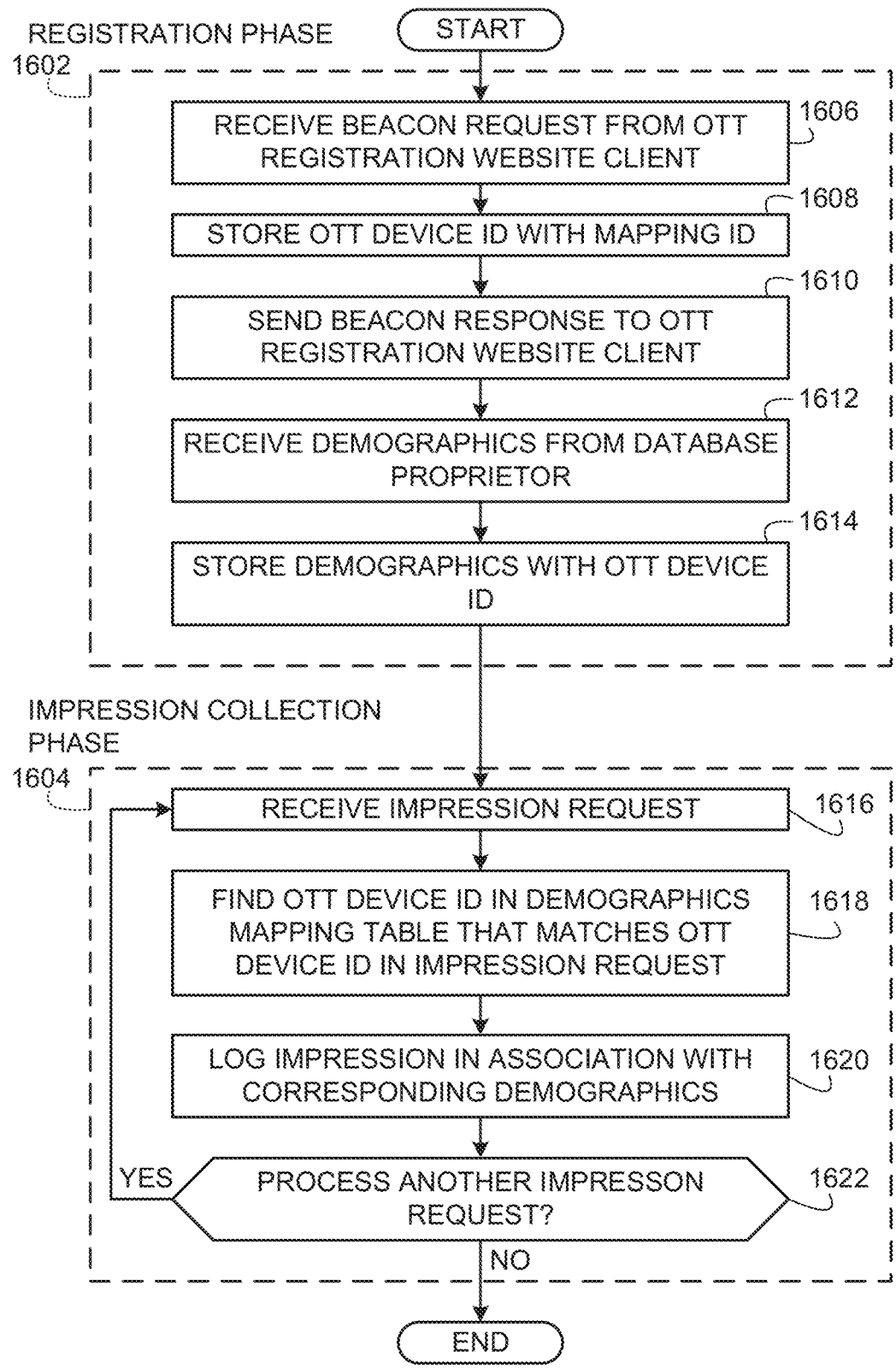
FIG. 16 is a flow diagram representative of example machine readable instructions that may be executed to implement the example AME OTT device ID collector, the DP demographics collector, and the example AME impressions collector of FIG. 12 to associate OTT device identifiers with demographics of audience members during the registration phase of FIG. 2 and to log impressions in association with corresponding OTT device identifiers during the impression collection phase of FIG. 6.

The example flow diagram of FIG. 16 is shown as two phases including an example registration phase 1602 and an example impression collection phase 1604. During the example registration phase 1602, the AME OTT device ID collector 1218 and the DP demographics collector 1232 store the OTT device ID 112 with corresponding demographics 118 from the DP 116. During the example impression collection phase 1604, the AME impressions collector 1220 logs the impressions 606 (FIG. 6) in association with the demographics 118 corresponding to the OTT device ID 112 of the OTT device 102.

The example registration phase 1602 of FIG. 16 begins at block 1606 at which the AME OTT device ID collector 1218 receives the beacon request 120 (FIGS. 2 and 12) from the OTT registration web site client (e.g., the computer 110 that access the OTT registration website 108 of FIGS. 2 and 12). The example AME OTT device ID collector 1218 stores the OTT device ID 112 from the beacon request 120 in association with the mapping ID 126 (block 1608). For example, the AME OTT device ID collector 1218 may generate the mapping ID 126 for the OTT device ID 112 and store the OTT device ID 112 in association with its corresponding mapping ID 126 in the demographics mapping table 500 of FIG. 5. The AME OTT device ID collector 1218 sends the beacon response 122 (FIGS. 2 and 12) to the OTT registration website client (e.g., the computer 110 that access the OTT registration website 108 of FIGS. 2 and 12) (block 1610). For example, the AME OTT device ID collector 1218 sends the redirect request 124 (FIGS. 2 and 12) and the mapping ID 126 in the beacon response 122 to the computer 110 as described above in connection with FIGS. 2 and 12.

The example DP demographics collector 1232 receives the demographics 118 from the DP 116 (block 1612). For example, the DP demographics collector 1232 receives the demographics 118 in association with the mapping ID 126 in the demographics share communication 134 (FIGS. 2 and 12) as described above in connection with FIGS. 2 and 12. The example DP demographics collector 1232 stores the demographics 118 in association with the corresponding OTT device ID 112 (block 1614). For example, the DP demographics collector 1232 finds the mapping ID 126 in the demographics mapping table 500 that matches the mapping ID 126 in the demographics share communication 134, and stores the demographics 118 from the demographics share communication 134 in association with the OTT device ID 112 associated with the matching mapping ID 126 in the demographics mapping table 500.

In the example impression collection phase 1604, the AME impressions collector 1220 receives the impression request 602 (FIGS. 5 and 12) from the OTT device 102 (block 1616). For example, the AME impressions collector 1220 receives the media ID 604 in association with the OTT device ID 112 in the impression request 602. The AME impressions collector 1220 finds the OTT device ID 112 in the demographics mapping table 500 that matches the OTT device ID 112 in the impression request 602 (block 1618). For example, an impression 606 logged by the AME impressions collector 1220 will correspond to the demographics 118 stored in association with the OTT device ID 112 in the demographics mapping table 500 that is the same as the OTT device ID 112 in the impression request 602. The example AME impressions collector 1220 logs an impression 606 in association with the corresponding demographics 118 in the impression logs data structure 608 (FIGS. 6 and 12) (block 1620).

The example AME impressions collector 1220 determines whether there is another impression request 602 to be processed (block 1622). For example, the OTT device 102 may send subsequent impression requests 602 for subsequently accessed media. If the example AME impressions collector 1220 determines that there is another impression request 602 to be process (block 1622), control returns to block 1616. Otherwise, the example process of FIG. 16 ends.

Figure 17:
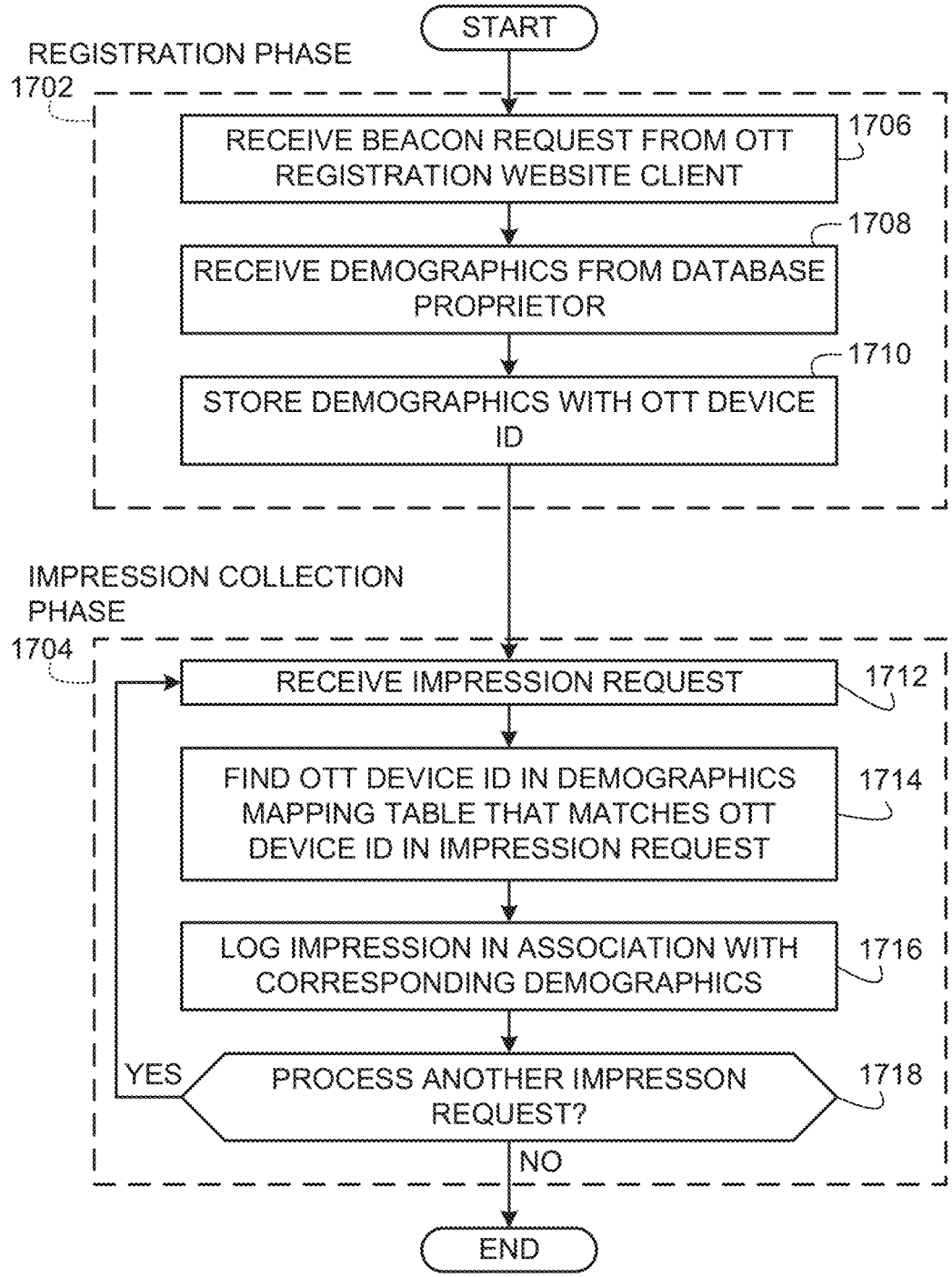
FIG. 17 is a flow diagram representative of example machine readable instructions that may be executed to implement the example AME OTT device ID collector, the DP demographics collector, and the example AME impressions collector of FIG. 13 to associate OTT device identifiers with demographics of audience members during the registration phase of FIG. 3 and to log impressions in association with corresponding OTT device identifiers during the impression collection phase of FIG. 7.

The example flow diagram of FIG. 17 is shown as two phases including an example registration phase 1702 and an example impression collection phase 1704. During the example registration phase 1702, the AME OTT device ID collector 1218 and the DP demographics collector 1232 store the OTT device ID 112 with corresponding demographics 118 from the DP 116. During the example impression collection phase 1704, the AME impressions collector 1220 logs the impressions 606 in association with the demographics 118 corresponding to the OTT device ID 112 of the OTT device 102.

The example registration phase 1702 of FIG. 17 begins at block 1706 at which the AME OTT device ID collector 1218 receives the beacon request 120 (FIGS. 3 and 13) from the OTT registration web site client (e.g., the computer 110 that access the OTT registration website 108 of FIGS. 3 and 13). The example DP demographics collector 1232 receives the demographics 118 from the DP 116 (block 1708). For example, the DP demographics collector 1232 receives the demographics 118 in association with the OTT device ID 112 in the demographics share communication 134 as described above in connection with FIGS. 3 and 13. The example DP demographics collector 1232 stores the demographics 118 in association with the corresponding OTT device ID 112 (block 1710). For example, the DP demographics collector 1232 stores the demographics 118 from the demographics share communication 134 in association with the OTT device ID 112 in the demographics mapping table 500 of FIG. 5.

In the example impression collection phase 1704, the AME impressions collector 1220 receives the impression request 602 (FIG. 13) from the OTT device 102 (block 1712). For example, the AME impressions collector 1220 receives the media ID 604 in association with the OTT device ID 112 in the impression request 602. The AME impressions collector 1220 finds the OTT device ID 112 in the demographics mapping table 500 that matches the OTT device ID 112 in the impression request 602 (block 1714). For example, an impression 606 logged by the AME impressions collector 1220 will correspond to the demographics 118 stored in association with the OTT device ID 112 in the demographics mapping table 500 that is the same as the OTT device ID 112 in the impression request 602. The example AME impressions collector 1220 logs an impression 606 in association with the corresponding demographics 118 in the impression logs data structure 608 (FIG. 13) (block 1716).

The example AME impressions collector 1220 determines whether there is another impression request 602 to be processed (block 1718). For example, the OTT device 102 may send subsequent impression requests 602 for subsequently accessed media. If the example AME impressions collector 1220 determines that there is another impression request 602 to be process (block 1718), control returns to block 1712. Otherwise, the example process of FIG. 17 ends.

Figure 18:
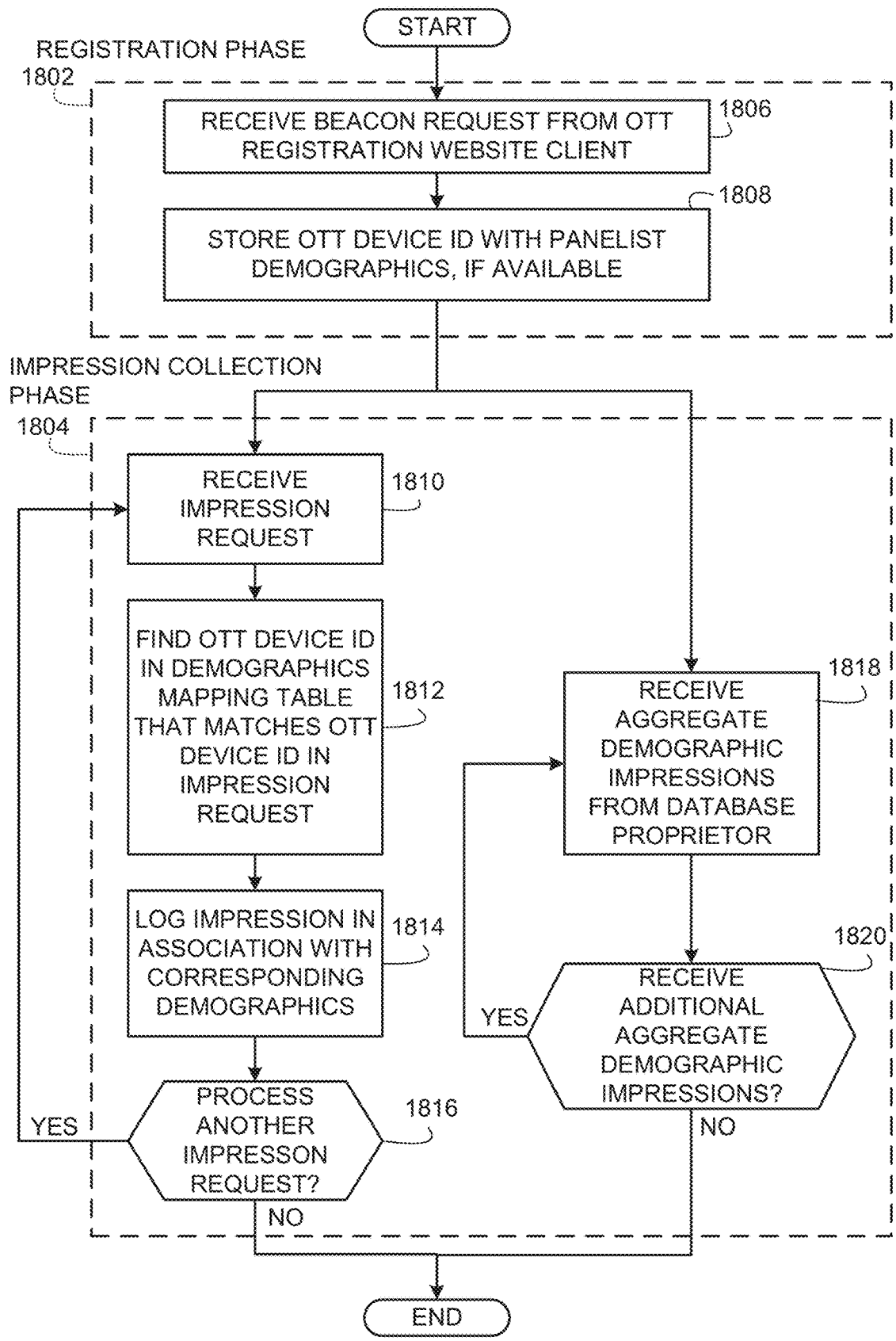
FIG. 18 is a flow diagram representative of example machine readable instructions that may be executed to implement the example AME OTT device ID collector, the DP demographics collector, and the example AME impressions collector of FIG. 14 to associate OTT device identifiers with demographics of audience members during the registration phase of FIGS. 2, 3 and/or 4 and to log impressions in association with corresponding OTT device identifiers during the impression collection phase of FIG. 10.

Turning now to FIG. 18, the flow diagram is representative of machine readable instructions that may be used to log impressions at the AME 114 and to collect aggregate demographic impressions 1106 from the DP 116. The example flow diagram of FIG. 18 is shown as two phases including an example registration phase 1802 and an example impression collection phase 1804. During the example registration phase 1802, the AME OTT device ID collector 1218 stores the OTT device ID 112 with corresponding panelist demographics collected by the AME 114 from audience members that are panelists of the AME 114. During the example impression collection phase 1804, the AME impressions collector 1220 logs user-level impressions 606, and the DP demographics collector 1232 receives the aggregate demographic impressions 1106 from the DP 116.

The example registration phase 1802 of FIG. 18 begins at block 1806 at which the AME OTT device ID collector 1218 receives the beacon request 120 (FIG. 4) from the OTT registration website client (e.g., the computer 110 that access the OTT registration website 108 of FIG. 4). The example AME OTT device ID collector 1218 stores the OTT device ID 112 from the beacon request 120 in association with AME panelist demographics, if available (block 1808). For example, the audience member 106 corresponding to the OTT device ID 112 may be a panelist of the AME 114.

In the example impression collection phase 1804, the AME impressions collector 1220 receives the impression request 602 (FIGS. 6, 8, 9, and 10) from the OTT device 102 (block 1810). For example, the AME impressions collector 1220 receives the media ID 604 in association with the OTT device ID 112 in the impression request 602. The AME impressions collector 1220 finds the OTT device ID 112 in the demographics mapping table 500 of FIG. 5 that matches the OTT device ID 112 in the impression request 602 (block 1812). For example, an impression 606 logged by the AME impressions collector 1220 may correspond to AME panelist demographics associated with the OTT device ID 112 in the demographics mapping table 500. The example AME impressions collector 1220 logs an impression 606 in association with the corresponding AME panelist demographics in the impression logs data structure 608 (FIG. 6) (block 1814). For examples in which the audience member 106 is not an AME panelist and, thus, the OTT device ID 112 does not correspond to any AME panelist demographics, the AME impressions collector 1220 may still log an impression based on the impression request 602.

The example AME impressions collector 1220 determines whether there is another impression request 602 to be processed (block 1816). For example, the OTT device 102 may send subsequent impression requests 602 for subsequently accessed media. If the example AME impressions collector 1220 determines that there is another impression request 602 to be process (block 1816), control returns to block 1810. Otherwise, the example process of FIG. 18 ends.

Also during the impression collection phase 1804 of FIG. 18, the DP demographics collector 1232 receives the example aggregate demographic impressions 1106 (FIG. 11) from the DP 116 (block 1818). In some examples, the received aggregate demographic impressions 1106 are generated by the DP 116 based on impression requests 602 sent to the DP 116 by the OTT device 102. The DP demographics collector 1232 determines whether to receive additional aggregate demographic impressions (block 1820) from the DP 116 and/or from any other DP. If there are additional aggregate demographics to be received, control returns to block 1818. Otherwise, the example process of FIG. 18 ends.

Figure 19:
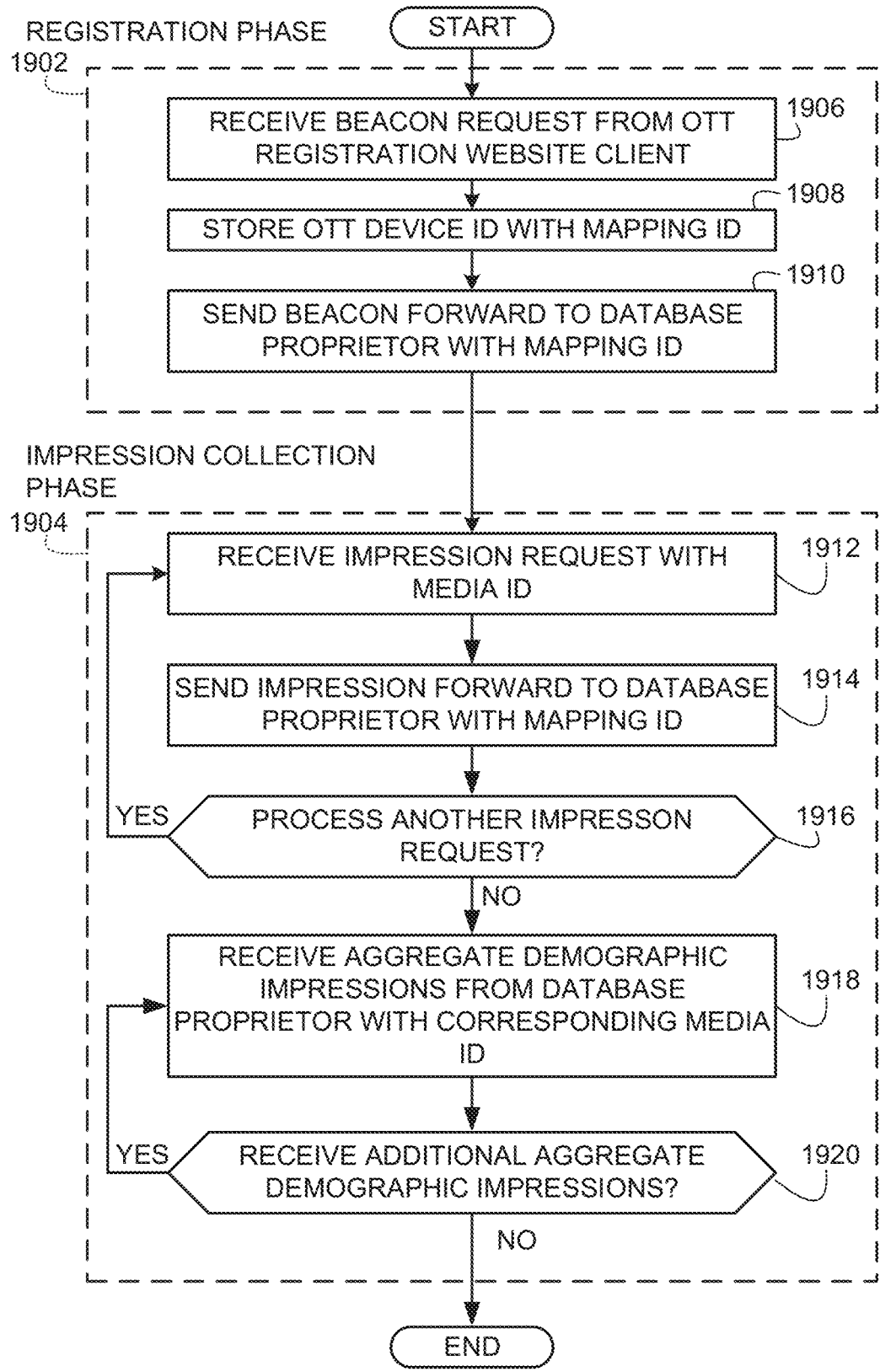
FIG. 19 is a flow diagram representative of example machine readable instructions that may be executed to implement the example AME OTT device ID collector, the DP demographics collector, and the example AME impressions collector of FIG. 15 to associate OTT device identifiers with demographics of audience members during the registration phase of FIGS. 2, 3 and/or 4 and to log impressions in association with corresponding OTT device identifiers during the impression collection phase of FIG. 9.

The example flow diagram of FIG. 19 is shown as two phases including an example registration phase 1902 and an example impression collection phase 1904. During the example registration phase 1902, the AME OTT device ID collector 1218 store a OTT device ID 112 with a mapping ID 126 and provides the mapping ID 126 to the DP 116. During the example impression collection phase 1904, the AME impressions collector 1220 logs the impressions 606 (FIG. 6) and the DP demographic collector 1232 store aggregate demographic impressions 1106 (FIG. 11) received from the DP 116.

The example registration phase 1902 of FIG. 19 begins at block 1906 at which the AME OTT device ID collector 1218 receives the beacon request 120 (FIG. 4) from the OTT registration website client (e.g., the computer 110 that access the OTT registration website 108 of FIG. 4). The example AME OTT device ID collector 1218 stores the OTT device ID 112 from the beacon request 120 in association with the mapping ID 126 (block 1908). The AME OTT device ID collector 1218 sends a beacon forward communication 404 with a user/device ID 402 and a mapping ID 126 to the DP 116 (block 1910).

In the example impression collection phase 1904, the AME impressions collector 1220 receives the impression request 602 (FIGS. 6, 8, 9, and 10) from the OTT device 102 (block 1912). The example the AME impressions collector 1220 sends an impression forward 802 (FIGS. 8 and 9) to the DP (block 1914). The example AME impressions collector 1220 determines whether there is another impression request 602 to be processed (block 1916). For example, the OTT device 102 may send subsequent impression requests 602 for subsequently accessed media. If the example AME impressions collector 1220 determines that there is another impression request 602 to be process, control returns to block 1912.

The DP demographic collector 1232 receives aggregate demographic impressions 1106 from the DP 116 based on the impression forwards 802 sent to the DP 116 by the AME impressions collector 1220 (block 1918). The DP demographics collector 1232 determines whether to receive additional aggregate demographic impressions (block 1920) from the DP 116 and/or from any other DP. If there are additional aggregate demographics to be received, control returns to block 1918. Otherwise, the example process of FIG. 19 ends.

Figure 20:
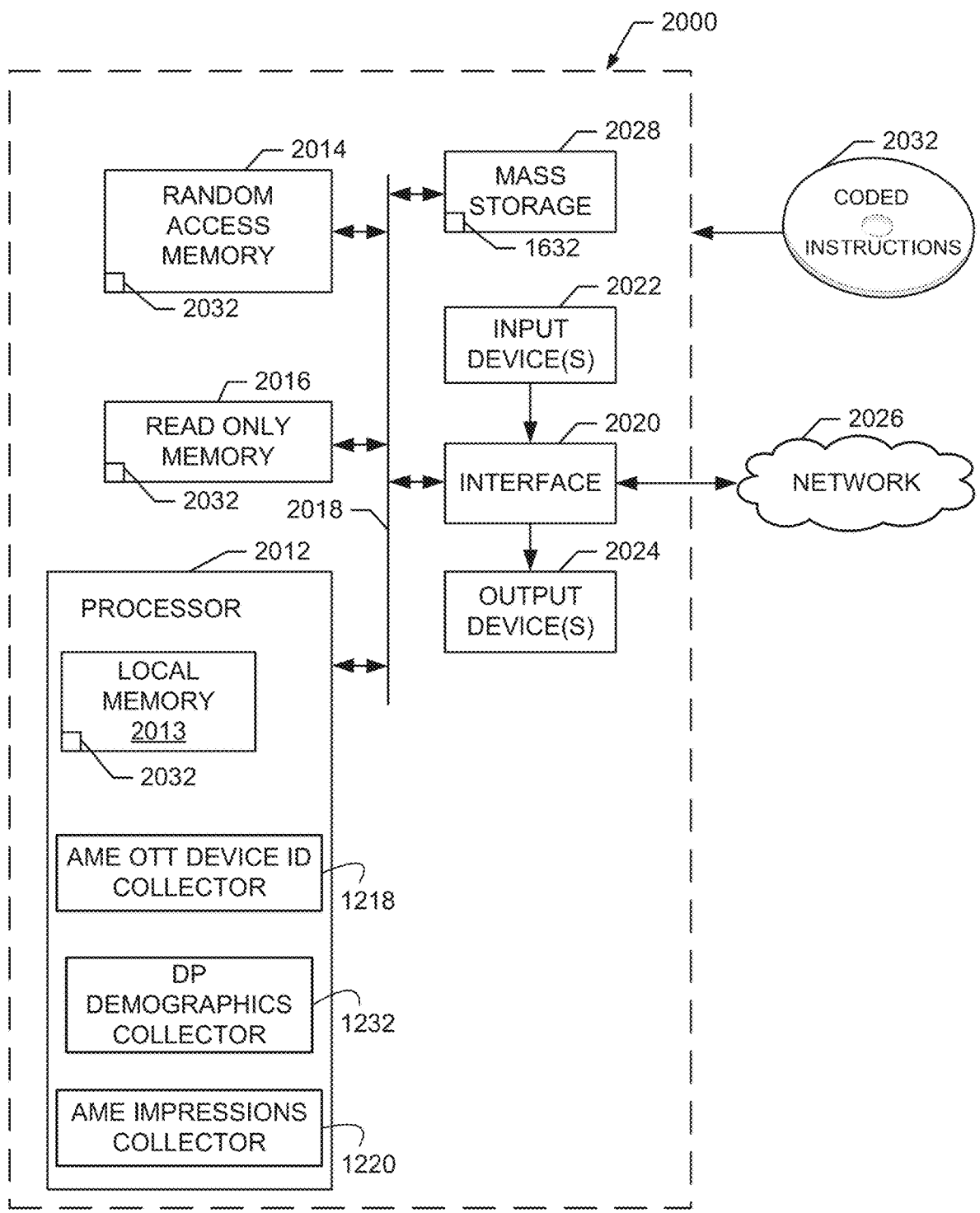
FIG. 20 illustrates an example processor system structured to execute the example instructions of FIGS. 16, 17, 18, and/or 19 to implement the example apparatus of FIGS. 12, 13, 14, and/or 15.

FIG. 20 is a block diagram of an example processor platform 2000 capable of executing the instructions of FIGS. 16, 17, 18, and/or 19 to implement the example AME OTT device ID collector 1218, the example DP demographics collector 1232, and the example AME impressions collector 1220 of FIGS. 12, 13, 14, and 15. The processor platform 2000 can be, for example, a server, a personal computer, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

In the illustrated example, the processor 2012 implements the example AME OTT device ID collector 1218, the example DP demographics collector 1232, and/or the example AME impressions collector 1220 described above in connection with FIGS. 12, 13, 14, and 15.

The processor 2012 of the illustrated example includes a local memory 2013 (e.g., a cache). The processor 2012 of the illustrated example is in communication with a main memory including a volatile memory 1614 and a non-volatile memory 2016 via a bus 2018. The volatile memory 2014 may be implemented by Synchronous Dynamic Random Access Memory (SDRAM), Dynamic Random Access Memory (DRAM), RAIVIBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

In the illustrated example, the local memory 2013 stores the example demographics mapping table 500 described above in connection with FIG. 5 and the example impression logs data structure 608 described above in connection with FIGS. 6 and 7. In other examples any one or more of the local memory 2013, the random access memory 2014, the read only memory 2016, and/or a mass storage device 2028 may store the example demographics mapping table 500 and/or the example impression logs data structure 608.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2024 are also connected to the interface circuit 1320 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

Coded instructions 2032 include the machine readable instructions of FIGS. 16, 17, 18, and/or 19 and may be stored in the mass storage device 2028, in the volatile memory 2014, in the non-volatile memory 2016, and/or on a removable tangible computer readable storage medium such as a CD or DVD.

From the foregoing, it will be appreciated that examples have been disclosed which allow impressions gathered from OTT devices to be associated with demographic information. In examples disclosed herein, a trusted intermediary (e.g., the AME) collects impressions from OTT devices and associated demographic data from DPs without requiring that each OTT device manufacturer connect to each DP.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
memory;
programmable circuitry; and
instructions to cause the programmable circuitry to:
access a first request, the first request received at a first server from a user-controlled client device after the user-controlled client device causes registration of an over-the-top device at a registration website, the first request including an over-the-top device identifier that identifies the over-the-top device, the over-the-top device different from the user-controlled client device;
cause transmission of a mapping identifier, associated with the over-the-top device identifier, to a second server of a database proprietor to associate the mapping identifier to demographics provided by the database proprietor, the mapping identifier being different from the over-the-top device identifier, the mapping identifier to obfuscate the over-the-top device identifier from the second server of the database proprietor;

receive the mapping identifier and the demographics from the database proprietor, the demographics corresponding to a user of the user-controlled client device;
store the demographics in association with the over-the-top device identifier based on the mapping identifier;
access a second request, the second request from the over-the-top device, the second request including the over-the-top device identifier and a media identifier;
associate the media identifier with the demographics based on the association of the over-the-top device identifier with the demographics; and
log an impression associated with the media identifier and the demographics.

2. The system of claim 1, wherein the programmable circuitry is to access aggregate demographic impression data from the database proprietor, the aggregate demographic impression data including the media identifier and the demographics corresponding to the user.

3. The system of claim 2, wherein the programmable circuitry is to access the first request at a first domain, and the database proprietor is in a second domain.

4. The system of claim 1, wherein the first request is a hypertext transfer protocol (HTTP) request or an HTTP Secure (HTTPS) request, and the second request is an impression request.

5. The system of claim 1, wherein the registration website is tagged with instructions that cause the first request to be communicated to the first server in response to the registration of the over-the-top device.

6. The system of claim 1, wherein the over-the-top device presents media via a media presentation device and is incorporated into the media presentation device.

7. A non-transitory computer readable storage medium comprising instructions to cause programmable circuitry to at least:
access a first request, the first request received at a first server from a user-controlled client device after the user-controlled client device causes registration of an over-the-top device at a registration website, the first request including an over-the-top device identifier that identifies the over-the-top device, the over-the-top device different from the user-controlled client device;
cause transmission of a mapping identifier, associated with the over-the-top device identifier, to a second server of a database proprietor to associate the mapping identifier to demographics provided by the database proprietor, the mapping identifier set to a first value different from a second value of the over-the-top device identifier, the mapping identifier to obfuscate the over-the-top device identifier from the second server of the database proprietor;
receive the demographics in association with the mapping identifier from the database proprietor, the demographics corresponding to a user of the user-controlled client device;
store the demographics in association with the over-the-top device identifier based on the mapping identifier;
access a second request, the second request from the over-the-top device, the second request including the over-the-top device identifier and a media identifier;
associate the media identifier with the demographics based on the association of the over-the-top device identifier with the demographics; and
log an impression associated with the media identifier and the demographics.

8. The non-transitory computer readable storage medium of claim 7, wherein the instructions are to cause the programmable circuitry to access aggregate demographic impression data from the database proprietor, the aggregate demographic impression data including the media identifier and the demographics.

9. The non-transitory computer readable storage medium of claim 8, wherein the instructions are to cause the programmable circuitry to access the first request at a first domain, and the database proprietor is in a second domain.

10. The non-transitory computer readable storage medium of claim 7, wherein the first request is a hypertext transfer protocol (HTTP) request or an HTTP Secure (HTTPS) request, and the second request is an impression request.

11. The non-transitory computer readable storage medium of claim 7, wherein the registration website is tagged with instructions that cause the first request to be communicated to the first server in response to the registration of the over-the-top device.

12. The non-transitory computer readable storage medium of claim 7, wherein the over-the-top device presents media via a media presentation device and is incorporated into the media presentation device.

13. A method comprising:
accessing a first request, the first request received at a first server from a user-controlled client device after the user-controlled client device causes registration of an over-the-top device at a registration website, the first request including an over-the-top device identifier that identifies the over-the-top device, the over-the-top device different from the user-controlled client device;
causing, by executing an instruction with programmable circuitry, transmission of a mapping identifier, associated with the over-the-top device identifier, to a second server of a database proprietor to associate the mapping identifier to demographics provided by the database proprietor, the mapping identifier different from the over-the-top device identifier, the mapping identifier to obfuscate the over-the-top device identifier from the second server of the database proprietor;
receiving the demographics associated with the mapping identifier from the database proprietor, the demographics corresponding to a user of the user-controlled client device;
storing, by executing an instruction with the programmable circuitry, the demographics in association with the over-the-top device identifier based on the mapping identifier;
accessing, by executing an instruction with the programmable circuitry, a second request, the second request from the over-the-top device, the second request including the over-the-top device identifier and a media identifier;
associating, by executing an instruction with the programmable circuitry, the media identifier with the demographics based on the association of the over-the-top device identifier with the demographics; and
logging, by executing an instruction with the programmable circuitry, an impression associated with the media identifier and the demographics.

14. The method of claim 13, further including accessing aggregate demographic impression data from the database proprietor, the aggregate demographic impression data including the media identifier and the demographics corresponding to the user.

15. The method of claim 14, further including accessing the first request at a first domain, and the database proprietor is in a second domain.

16. The method of claim 13, wherein the first request is a hypertext transfer protocol (HTTP) request or an HTTP Secure (HTTPS) request, and the second request is an impression request.

17. The method of claim 13, wherein the over-the-top device is separate from the user-controlled client device.

18. The method of claim 13, wherein the registration website is tagged with instructions that cause the first request to be communicated to the first server in response to the registration of the over-the-top device.

* * * * *